United States Patent
Uejo et al.

(10) Patent No.: US 11,410,442 B2
(45) Date of Patent: Aug. 9, 2022

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventors: Hiroyoshi Uejo, Kanagawa (JP); Naohiro Nukaya, Kanagawa (JP); Chizuko Sento, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/781,429

(22) Filed: Feb. 4, 2020

(65) Prior Publication Data
US 2021/0089804 A1 Mar. 25, 2021

(30) Foreign Application Priority Data
Sep. 19, 2019 (JP) .............................. JP2019-170518

(51) Int. Cl.
*G06V 30/148* (2022.01)
*G06V 30/414* (2022.01)
*G06V 30/416* (2022.01)
*G06V 30/10* (2022.01)

(52) U.S. Cl.
CPC .......... *G06V 30/153* (2022.01); *G06V 30/414* (2022.01); *G06V 30/416* (2022.01); *G06V 30/10* (2022.01)

(58) Field of Classification Search
CPC ........... G06K 9/00463; G06K 9/00469; G06K 9/344; G06K 2209/01; G06F 40/103; G06F 21/6245

USPC .......................................................... 382/176
See application file for complete search history.

(56) References Cited

U.S. PATENT DOCUMENTS

| | | | |
|---|---|---|---|
| 7,769,249 B2 | 8/2010 | Kasatani | |
| 9,645,978 B2 * | 5/2017 | Frem | G06K 9/00463 |
| 10,594,899 B1 * | 3/2020 | Tong | H04N 1/4493 |
| 10,638,001 B2 * | 4/2020 | Fujiki | H04N 1/32112 |
| 2020/0143158 A1 * | 5/2020 | Tomihisa | H04N 1/00331 |
| 2020/0327320 A1 * | 10/2020 | Berseth | G06K 9/00456 |
| 2021/0081661 A1 * | 3/2021 | Dabholkar | G06F 40/232 |

FOREIGN PATENT DOCUMENTS

| | | |
|---|---|---|
| JP | 2007-65994 A | 3/2007 |
| JP | 2015-90657 A | 5/2015 |
| JP | 2017-212575 A | 11/2017 |
| JP | 2019-32645 A | 2/2019 |

OTHER PUBLICATIONS

Computer English translation of French Patent No. FR2737930A1, pp. 1-9. (Year: 1997).*

* cited by examiner

*Primary Examiner* — Daniel G Mariam
(74) *Attorney, Agent, or Firm* — Oliff PLC

(57) ABSTRACT

An information processing apparatus includes a processor. The processor is configured to receive first image data representing a document, and generate, by processing corresponding to appearance characteristics of the document, second image data not representing information of a deletion target out of information represented in the first image data but representing information other than the information of the deletion target.

8 Claims, 17 Drawing Sheets

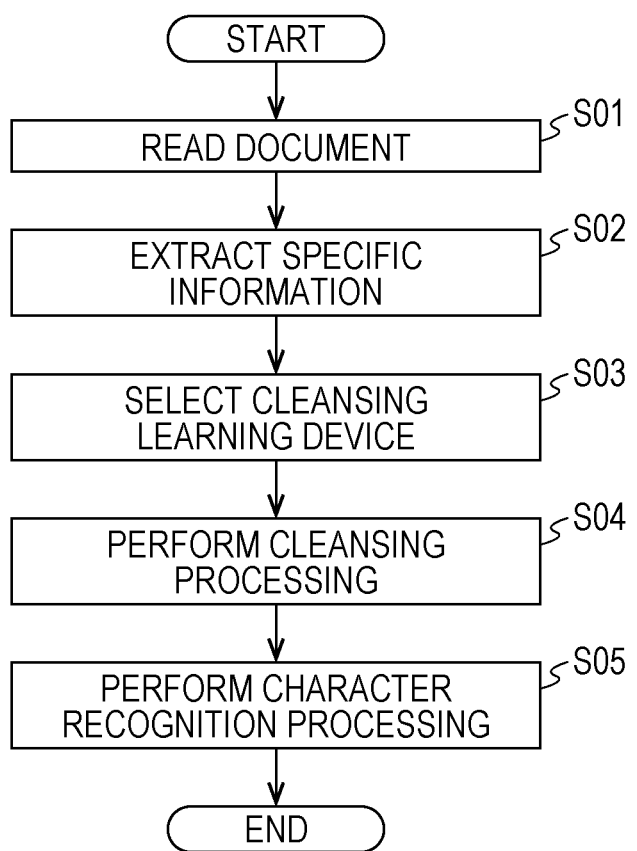

(1–1) | CERTIFICATE OF ALL RECORDS

| | |
|---|---|
| REGISTERED DOMICILE *28k* FULL NAME | WW, ZZ CHOME, YY CITY, XX PREFECTURE *28a*<br>FUJI JIRO *28m* |
| MATTERS OF THE FAMILY REGISTER<br>REVISION OF THE FAMILY REGISTER | [DATE OF REVISION] Y Z, HEISEI XX *28g*<br>[REASON OF REVISION] REVISION OF FAMILY REGISTER PURSUANT TO ARTICLE 2, PARAGRAPH 1 OF SUPPLEMENTARY PROVISIONS, ORDINANCE OF THE MINISTRY OF JUSTICE No. 51 of 1994<br>*28b* |
| PERSON RECORDED IN THE FAMILY REGISTER<br>[REMOVED] *28h* | [NAME] JIRO *28c*<br>[DATE OF BIRTH] M1 D1, TAISHO Y1<br>[FATHER] FUJI TARO<br>[MOTHER] FUJI HANAKO<br>[RELATIONSHIP] FIRST SON *28i* |
| PERSON RECORDED IN THE FAMILY REGISTER | [NAME] UMEKO *28d*<br>[DATE OF BIRTH] M2 D2, TAISHO Y2<br>[FATHER] KOFUJI TARO<br>[MOTHER] KOFUJI HANAKO<br>[RELATIONSHIP] THIRD DAUGHTER |
| MATTERS OF THE PERSONAL STATUS<br>BIRTH | [BIRTH DATE] M2 D2, TAISHO Y2<br>[PLACE OF BIRTH] ZZ CITY, WW PREFECTURE *28e*<br>[DATE OF NOTIFICATION] M2 D3, TAISHO Y2<br>[NOTIFIED BY] FATHER |
| PERSON RECORDED IN THE FAMILY REGISTER | [NAME] SABURO<br>[DATE OF BIRTH] M3 D3, SHOWA Y3<br>[FATHER] KOFUJI TARO<br>[MOTHER] KOFUJI HANAKO<br>[RELATIONSHIP] THIRD SON |
| MATTERS OF THE PERSONAL STATUS<br>BIRTH | [BIRTH DATE] M3 D3, SHOWA Y3<br>[PLACE OF BIRTH] WW CITY, YY PREFECTURE<br>[DATE OF NOTIFICATION] M3 D4, SHOWA Y3<br>[NOTIFIED BY] FATHER |
| | BLANK BELOW |

NUMBER OF ISSUE 00123456

*28j* THIS IS A DOCUMENT CERTIFYING ALL MATTERS RECORDED IN THE FAMILY REGISTER.

MM DD, HEISEI YY

OFFICIAL SEAL

*28f* MAYOR OF YY CITY, XX PREFECTURE
FUJIYAMA TARO

| | | | |
|---|---|---|---|
| INVALIDATED FAMILY REGISTER | DELETED ON MARCH 1, 2001, BASED ON THE REVISION BY ARTICLE 2, PARAGRAPH 1 OF SUPPLEMENTARY PROVISIONS, MINISTRY OF JUSTICE ORDINANCE NO. 51 OF 1994. | | |
| DOMICILE REGISTERED | ZZ, YY CITY, XX PREFECTURE | NAME FULL | FUJI JIRO |

| | | | |
|---|---|---|---|
| COMPILED ON OCTOBER 10, 1961, BASED ON THE REVISION ON APRIL 1, 1958 BY MINISTRY OF JUSTICE ORDINANCE NO. 27 OF 1957 | | | |
| NOTIFIED ON XXXXXXX TAISHO Y1 | FATHER | FUJI TARO | SON FIRST |
| REGISTERED ON YY ZZ, XX | MOTHER | FUJI HANAKO | |
| REMOVED ON XX XX, XX | HUSBAND | ~~JIRO~~ | |
| | DATE BIRTH | M1 D1, TAISHO Y1 | |
| BORN ON XXXXXXX TAISHO Y3 | FATHER | KOFUJI TARO | DAUGHTER THIRD |
| REGISTERED ON YY ZZ, XX | MOTHER | KOFUJI CHIKAKO | |
| | WIFE | UMEKO | |
| | DATE BIRTH | M3 D3, TAISHO Y3 | |
| BORN ON XXXXXXX SHOWA Y4 | FATHER | FUJI JIRO | SON FIRST |
| | MOTHER | FUJI UMEKO | |
| | | SABURO | |
| | DATE BIRTH | M4 D4, SHOWA Y4 | |

I HEREBY ATTEST THAT THIS IS A TRUE COPY OF THE ORIGINAL INVALIDATED FAMILY REGISTER.
YY ZZ, XX

MAYOR OF YY CITY, XX PREFECTURE    FUJIYAMA TARO    OFFICIAL SEAL

| | | | | |
|---|---|---|---|---|
| INVALIDATED FAMILY REGISTER | | | | |
| DOMICILE REGISTERED | ZZ, YY CITY, XX PREFECTURE | FAMILY THE OF HEAD FORMER | FUJI TARO | |
| SUCCESSION TO THE HOUSE WAS NOTIFIED ON XXXXXXX, TAISHO 4 RECEIVED ON YY ZZ, XX<br>XXXXXXXXXX<br>XXXXXXXXXXXXX<br>XXXXXXXXXXX | | FAMILY THE OF HEAD | RELATIONSHIP | FIRST SON OF DECEASED FUJI TARO | SON FIRST |
| | | | FATHER | FUJI TARO | |
| | | | MOTHER | HANAKO | |
| | | | JIRO | | |
| | | | DATE BIRTH | M1 D1, MEIJI Y1 | |
| FIFTH DAUGHTER, XXXXXXX, MEIJI Y2 REGISTERED | | MOTHER | FATHER | OFUJI MANTARO | DAUGHTER FIFTH |
| | | | MOTHER | TAKAKO | |
| | | | ~~HANAKO~~ | | |
| | | | DATE BIRTH | M2 D2, MEIJI Y2 | |
| THIRD DAUGHTER, XXXXXXX, TAISHO Y3 REGISTERED | | WIFE | FATHER | KOFUJI TARO | DAUGHTER THIRD |
| | | | MOTHER | CHIKAKO | |
| | | | UMEKO | | |
| | | | DATE BIRTH | M3 D3, TAISHO Y3 | |
| XXXX, BORN ON XXXXXX, TAISHO Y4 | | SON FIRST | FATHER | FUJI JIRO | SON FIRST |
| | | | MOTHER | UMEKO | |
| | | | SABURO | | |
| | | | DATE BIRTH | M4 D4, TAISHO Y4 | |

I HEREBY ATTEST THAT THIS IS A TRUE COPY OF THE ORIGINAL INVALIDATED FAMILY REGISTER.
YY ZZ, XX

MAYOR OF YY CITY, XX PREFECTURE    FUJIYAMA TARO    OFFICIAL SEAL

FIG. 7

| DOMICILE REGISTERED OF ADDRESS | ZZ, YY CITY, XX PREFECTURE | FAMILY THE OF HEAD FORMER | FUJI TARO | | |
|---|---|---|---|---|---|
| | SUCCESSION TO THE HOUSE ON XXXXXXX, MEIJI 12 BECAME THE HEAD OF FAMILY AND REPORT THEREOF WAS RECEIVED ON THE SAME DAY<br>XXXXXXXXX<br>XXXXXXXXXXXXX<br>XXXXXXXXXXXX | FAMILY THE OF HEAD | RELATIONSHIP | DECEASED FATHER, FIRST SON OF FUJI TARO | |
| | | | FATHER | DECEASED FUJI TARO | |
| | | | MOTHER | HANAKO | |
| | | | FUJI JIRO | | |
| | | | DATE BIRTH | M1 D1, MEIJI Y1 | |
| | | | GROUND THAT A PERSON BECAME THE HEAD OF THE FAMILY, AND DATE | XXXXXXXXXXXXXXX<br>XXXXXXXXXXXXXXX<br>XXXXXXXX | |
| | FIFTH DAUGHTER, XXXXXXX, MEIJI Y2<br>REGISTERED | MOTHER | FATHER | OFUJI MANTARO | FIFTH DAUGHTER |
| | | | MOTHER | TAKAKO | |
| | | | HANAKO | | |
| | | | DATE BIRTH | M2 D2, MEIJI Y2 | |
| | THIRD DAUGHTER, XXXXXXX, MEIJI Y3<br>REGISTERED | WIFE | FATHER | KOFUJI TARO | THIRD DAUGHTER |
| | | | MOTHER | CHIKAKO | |
| | | | UMEKO | | |
| | | | DATE BIRTH | M3 D3, MEIJI Y3 | |
| | XXXX, BORN ON XXXXXX, MEIJI Y4 | SON FIRST | FATHER | FUJI JIRO | FIRST SON |
| | | | MOTHER | UMEKO | |
| | | | SABURO | | |
| | | | DATE BIRTH | M4 D4, MEIJI Y4 | |
| | XXXX, BORN ON XXXXXX, MEIJI Y5 | SON SECOND | FATHER | FUJI JIRO | SECOND SON |
| | | | MOTHER | UMEKO | |
| | | | SHIRO | | |
| | | | DATE BIRTH | M5 D5, MEIJI Y5 | |

FIG. 9

| | | |
|---|---|---|
| INVALIDATED FAMILY REGISTER | | |
| DOMICILE REGISTERED: ZZ, YY CITY, XX PREFECTURE | FAMILY TYPE OF HEAD FORMER | FUJI TARO |
| SUCCESSION TO THE HOUSE WAS NOTIFIED ON XXXXXXX, TAISHO 4 RECEIVED ON YY ZZ, XX<br>XXXXXXXXXX<br>XXXXXXXXXXXXX<br>XXXXXXXXXXX | RELATIONSHIP | FIRST SON OF DECEASED FUJI TARO |
| | FATHER | FUJI TARO — SON FIRST |
| | MOTHER | HANAKO |
| | FAMILY TYPE OF HEAD | JIRO |
| | DATE BIRTH | M1 D1, MEIJI Y1 |
| FIFTH DAUGHTER, XXXXXXX, MEIJI Y2 REGISTERED | FATHER | OFUJI MANTARO — DAUGHTER FIFTH |
| | MOTHER | TAKAKO |
| | MOTHER | ~~HANAKO~~ |
| | DATE BIRTH | M2 D2, MEIJI Y2 |
| THIRD DAUGHTER, XXXXXXX, TAISHO Y3 REGISTERED | FATHER | KOFUJI TARO — DAUGHTER THIRD |
| | MOTHER | CHIKAKO |
| | WIFE | UMEKO |
| | DATE BIRTH | M3 D3, TAISHO Y3 |
| XXXX, BORN ON XXXXXX, TAISHO Y4 | FATHER | FUJI JIRO — SON FIRST |
| | MOTHER | UMEKO |
| | SON FIRST | SABURO |
| | DATE BIRTH | M4 D4, TAISHO Y4 |

I HEREBY ATTEST THAT THIS IS A TRUE COPY OF THE ORIGINAL INVALIDATED FAMILY REGISTER.
YY ZZ, XX

MAYOR OF YY CITY, XX PREFECTURE    FUJIYAMA TARO    OFFICIAL SEAL

| INVALIDATED FAMILY REGISTER | DELETED ON MARCH 1, 2001, BASED ON THE REVISION BY ARTICLE 2, PARAGRAPH 1 OF SUPPLEMENTARY PROVISIONS, MINISTRY OF JUSTICE ORDINANCE NO. 51 OF 1994. | | |
|---|---|---|---|
| DOMICILE REGISTERED | ZZ, YY CITY, XX PREFECTURE | NAME FULL | FUJI JIRO |
| COMPILED ON OCTOBER 10, 1961, BASED ON THE REVISION ON APRIL 1, 1958 BY MINISTRY OF JUSTICE ORDINANCE NO. 27 OF 1957 | | | |
| NOTIFIED ON XXXXXXX TAISHO Y1 | | FATHER MOTHER | FUJI TARO / FUJI HANAKO (SON FIRST) |
| REGISTERED ON YY ZZ, XX | | | |
| REMOVED ON XX XX, XX | | HUSBAND | ~~JIRO~~ |
| | | DATE BIRTH | M1 D1, TAISHO Y1 |
| BORN ON XXXXXXX TAISHO Y3 | | FATHER MOTHER | KOFUJI TARO / KOFUJI CHIKAKO (DAUGHTER THIRD) |
| REGISTERED ON YY ZZ, XX | | | |
| | | WIFE | UMEKO |
| | | DATE BIRTH | M3 D3, TAISHO Y3 |
| BORN ON XXXXXXX SHOWA Y4 | | FATHER MOTHER | FUJI JIRO / FUJI UMEKO (SON FIRST) |
| | | | SABURO |
| | | DATE BIRTH | M4 D4, SHOWA Y4 |

I HEREBY ATTEST THAT THIS IS A TRUE COPY OF THE ORIGINAL INVALIDATED FAMILY REGISTER.
YY ZZ, XX

MAYOR OF YY CITY, XX PREFECTURE    FUJIYAMA TARO    OFFICIAL SEAL

FIG. 10

| INVALIDATED FAMILY REGISTER | | | | |
|---|---|---|---|---|
| DOMICILE REGISTERED: ZZ, YY CITY, XX PREFECTURE | | FAMILY THE OF HEAD FORMER | FUJI TARO | |
| SUCCESSION TO THE HOUSE WAS NOTIFIED ON XXXXXXX, TAISHO 4 RECEIVED ON YY ZZ, XX  XXXXXXXXXX  XXXXXXXXXXXXX  XXXXXXXXXXX | FAMILY THE OF HEAD | RELATIONSHIP | FIRST SON OF DECEASED FUJI TARO | SON FIRST |
| | | FATHER | FUJI TARO | |
| | | MOTHER | HANAKO | |
| | | JIRO | | |
| | | DATE BIRTH | M1 D1, MEIJI Y1 | |
| FIFTH DAUGHTER, XXXXXXX, MEIJI Y2 REGISTERED | MOTHER | FATHER | OFUJI MANTARO | DAUGHTER FIFTH |
| | | MOTHER | TAKAKO | |
| | | ~~HANAKO~~ | | |
| | | DATE BIRTH | M2 D2, MEIJI Y2 | |
| THIRD DAUGHTER, XXXXXXX, TAISHO Y3 REGISTERED | WIFE | FATHER | KOFUJI TARO | DAUGHTER THIRD |
| | | MOTHER | CHIKAKO | |
| | | UMEKO | | |
| | | DATE BIRTH | M3 D3, TAISHO Y3 | |
| XXXX, BORN ON XXXXXX, TAISHO Y4 | SON FIRST | FATHER | FUJI JIRO | SON FIRST |
| | | MOTHER | UMEKO | |
| | | SABURO | | |
| | | DATE BIRTH | M4 D4, TAISHO Y4 | |

I HEREBY ATTEST THAT THIS IS A TRUE COPY OF THE ORIGINAL INVALIDATED FAMILY REGISTER.
YY ZZ, XX

MAYOR OF YY CITY, XX PREFECTURE    FUJIYAMA TARO    OFFICIAL SEAL

| DOMICILE REGISTERED OF ADDRESS | ZZ, YY CITY, XX PREFECTURE | FAMILY THE OF HEAD FORMER | FUJI TARO | | |
|---|---|---|---|---|---|
| SUCCESSION TO THE HOUSE ON XXXXXXX, MEIJI 12 BECAME THE HEAD OF FAMILY AND REPORT THEREOF WAS RECEIVED ON THE SAME DAY<br>XXXXXXXXXX<br>XXXXXXXXXXXXX<br>XXXXXXXXXXXX | | FAMILY THE OF HEAD | RELATIONSHIP | DECEASED FATHER, FIRST SON OF FUJI TARO | |
| | | | FATHER | DECEASED FUJI TARO | |
| | | | MOTHER | HANAKO | |
| | | | FUJI JIRO | | |
| | | | DATE BIRTH | M1 D1, MEIJI Y1 | |
| | | | GROUND THAT A PERSON BECAME THE HEAD OF THE FAMILY, AND DATE | XXXXXXXXXXXXXXXX<br>XXXXXXXXXXXXXXXX<br>XXXXXXXXX | |
| FIFTH DAUGHTER, XXXXXXX, MEIJI Y2<br>REGISTERED | | MOTHER | FATHER | OFUJI MANTARO | FIFTH DAUGHTER |
| | | | MOTHER | TAKAKO | |
| | | | HANAKO | | |
| | | | DATE BIRTH | M2 D2, MEIJI Y2 | |
| THIRD DAUGHTER, XXXXXXX, MEIJI Y3<br>REGISTERED | | WIFE | FATHER | KOFUJI TARO | THIRD DAUGHTER |
| | | | MOTHER | CHIKAKO | |
| | | | UMEKO | | |
| | | | DATE BIRTH | M3 D3, MEIJI Y3 | |
| XXXX, BORN ON XXXXXX, MEIJI Y4 | | SON FIRST | FATHER | FUJI JIRO | FIRST SON |
| | | | MOTHER | UMEKO | |
| | | | SABURO | | |
| | | | DATE BIRTH | M4 D4, MEIJI Y4 | |
| XXXX, BORN ON XXXXXX, MEIJI Y5 | | SON SECOND | FATHER | FUJI JIRO | SECOND SON |
| | | | MOTHER | UMEKO | |
| | | | SHIRO | | |
| | | | DATE BIRTH | M5 D5, MEIJI Y5 | |

FIG. 15

| | | | |
|---|---|---|---|
| INVALIDATED FAMILY REGISTER | DELETED ON MARCH 1, 2001, BASED ON THE REVISION BY ARTICLE 2, PARAGRAPH 1 OF SUPPLEMENTARY PROVISIONS, MINISTRY OF JUSTICE ORDINANCE NO. 51 OF 1994. | | |
| DOMICILE REGISTERED | ZZ, YY CITY, XX PREFECTURE | NAME FULL | FUJI JIRO |
| | COMPILED ON OCTOBER 10, 1961, BASED ON THE REVISION ON APRIL 1, 1958 BY MINISTRY OF JUSTICE ORDINANCE NO. 27 OF 1957 | | |
| | NOTIFIED ON XXXXXXX TAISHO Y1 | MOTHER/FATHER | FUJI TARO / FUJI HANAKO — SON FIRST |
| | REGISTERED ON YY ZZ, XX | | |
| | REMOVED ON XX XX, XX | HUSBAND | ~~JIRO~~ |
| | | DATE BIRTH | M1 D1, TAISHO Y1 |
| | BORN ON XXXXXXX TAISHO Y3 | MOTHER/FATHER | KOFUJI TARO / KOFUJI CHIKAKO — DAUGHTER THIRD |
| | REGISTERED ON YY ZZ, XX | | |
| | | WIFE | UMEKO |
| | | DATE BIRTH | M3 D3, TAISHO Y3 |
| | BORN ON XXXXXXX SHOWA Y4 | MOTHER/FATHER | FUJI JIRO / FUJI UMEKO — SON FIRST |
| | | | SABURO |
| | | DATE BIRTH | M4 D4, SHOWA Y4 |

I HEREBY ATTEST THAT THIS IS A TRUE COPY OF THE ORIGINAL INVALIDATED FAMILY REGISTER.
YY ZZ, XX

MAYOR OF YY CITY, XX PREFECTURE     FUJIYAMA TARO     OFFICIAL SEAL

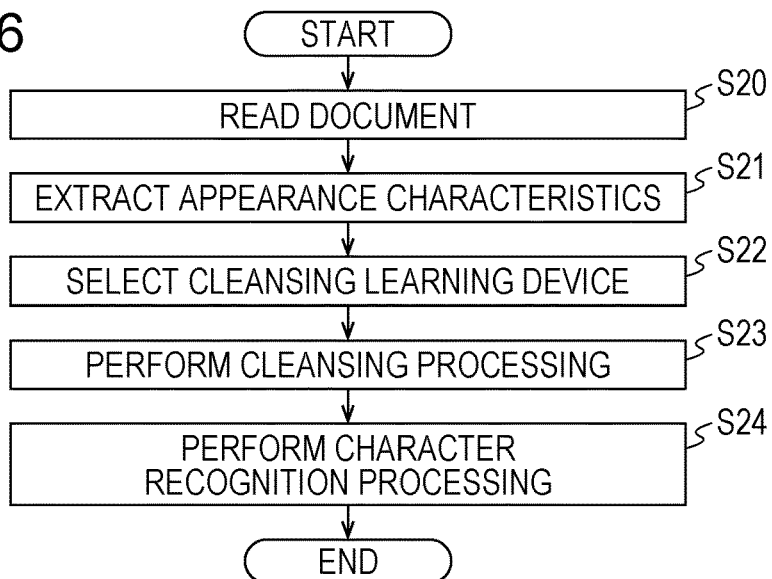
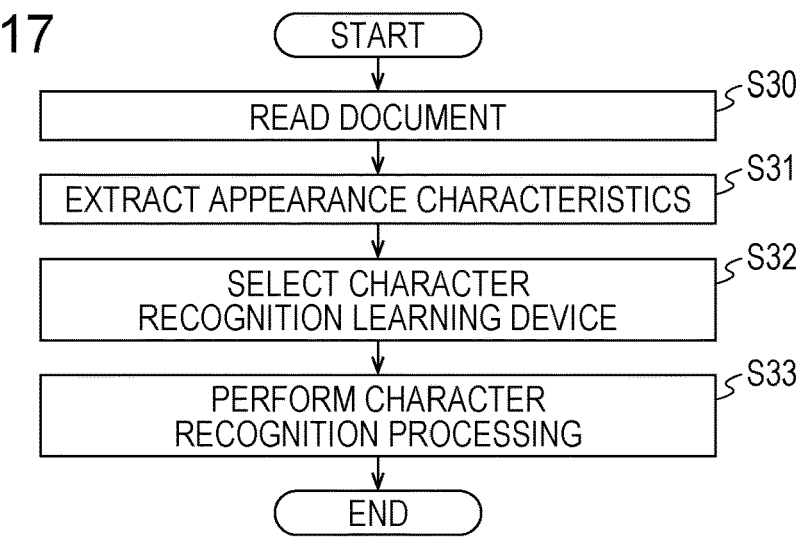
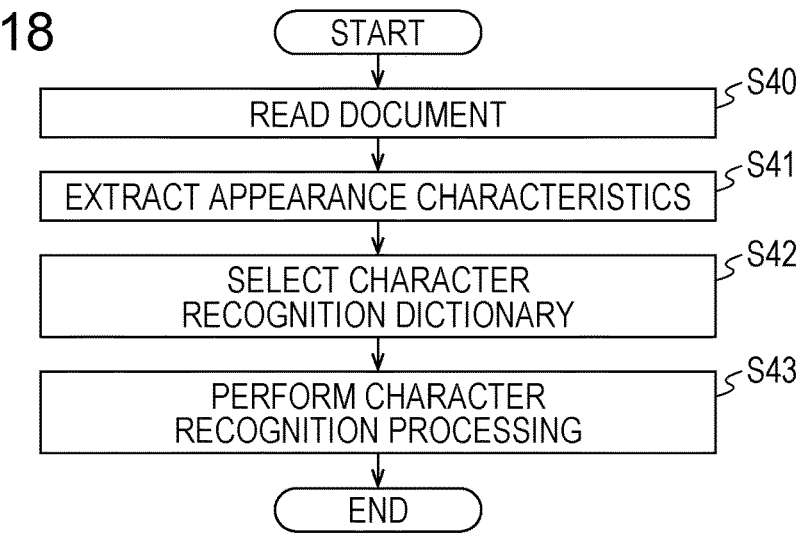

| INVALIDATED FAMILY REGISTER | DELETED ON MARCH 1, 2001, BASED ON THE REVISION BY ARTICLE 2, PARAGRAPH 1 OF SUPPLEMENTARY PROVISIONS, MINISTRY OF JUSTICE ORDINANCE NO. 51 OF 1994. | | |
|---|---|---|---|
| DOMICILE REGISTERED | ZZ, YY CITY, XX PREFECTURE | NAME FULL | FUJI JIRO |
| COMPILED ON OCTOBER 10, 1961, BASED ON THE REVISION ON APRIL 1, 1958 BY MINISTRY OF JUSTICE ORDINANCE NO. 27 OF 1957 | | | |
| NOTIFIED ON XXXXXXX TAISHO Y1 | FATHER | FUJI TARO | FIRST SON |
| REGISTERED ON YY ZZ, XX | MOTHER | FUJI HANAKO | |
| REMOVED ON XX XX, XX | HUSBAND | ~~JIRO~~ | |
| | DATE BIRTH | M1 D1, TAISHO Y1 | |
| BORN ON XXXXXXX TAISHO Y3 | FATHER | KOFUJI TARO | THIRD DAUGHTER |
| REGISTERED ON YY ZZ, XX | MOTHER | KOFUJI CHIKAKO | |
| | WIFE | UMEKO | |
| | DATE BIRTH | M3 D3, TAISHO Y3 | |
| BORN ON XXXXXXX SHOWA Y4 | FATHER | FUJI JIRO | FIRST SON |
| | MOTHER | FUJI UMEKO | |
| | | SABURO | |
| | DATE BIRTH | M4 D4, SHOWA Y4 | |

I HEREBY ATTEST THAT THIS IS A TRUE COPY OF THE ORIGINAL INVALIDATED FAMILY REGISTER.
YY ZZ, XX

MAYOR OF YY CITY, XX PREFECTURE    FUJIYAMA TARO    OFFICIAL SEAL

FIG. 19

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-170518 filed Sep. 19, 2019.

BACKGROUND

(i) Technical Field

The present disclosure relates to an information processing apparatus and a non-transitory computer readable medium.

(ii) Related Art

For recognition of characters in image data, image data not representing information of a deletion target, which is other than a recognition target, may be generated to increase accuracy of the recognition.

In Japanese Unexamined Patent Application Publication No. 2017-212575, an apparatus that determines the type of a business form and changes mask processing is described.

In Japanese Unexamined Patent Application Publication No. 2015-90657, an apparatus that displays a check image including information regarding a family register is described.

In Japanese Unexamined Patent Application Publication No. 2007-65994, an apparatus that specifies an optical character recognition (OCR) engine in accordance with the state of a recognition image and performs character recognition processing using the specified OCR engine is described.

In Japanese Unexamined Patent Application Publication No. 2019-32645, an apparatus that performs alignment between an image of a document in which information of an item is written and an image of a document in which no information is written to obtain a differential image and thus extracts an image of a part in which the information of the item is written, is described.

SUMMARY

In generating, in the case of fixed processing on, regardless of information represented in image data, image data not representing information of a deletion target, image data representing the information of the deletion target may be generated or image data not representing information of a recognition target may be generated, depending on the information represented in the image data.

Aspects of non-limiting embodiments of the present disclosure relate to improving accuracy of generation of image data not representing information of a deletion target, compared to a case where image data not representing information of a deletion target is generated by fixed processing regardless of information represented in image data or improving accuracy of recognition of a character as a recognition target, compared to a case where a character as a recognition target is recognized by fixed recognition processing regardless of information represented in image data.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor. The processor is configured to receive first image data representing a document, and generate, by processing corresponding to appearance characteristics of the document, second image data not representing information of a deletion target out of information represented in the first image data but representing information other than the information of the deletion target.

BRIEF DESCRIPTION OF THE DRAWINGS

Exemplary embodiments of the present disclosure will be described in detail based on the following figures, wherein:

FIG. 3 is a flowchart illustrating the flow of a process according to Example 1 of the first exemplary embodiment;

FIG. 4 is a diagram illustrating an example of a certificate of family register;

FIG. 5 is a diagram illustrating an example of a certificate of family register;

FIG. 6 is a diagram illustrating an example of a certificate of family register;

FIG. 7 is a diagram illustrating an example of a certificate of family register;

FIG. 9 is a diagram illustrating an example of a certificate of family register;

FIG. 10 is a diagram illustrating an example of a certificate of family register;

FIG. 11 is a diagram illustrating an example of a certificate of family register;

FIG. 12 is a diagram illustrating an example of a certificate of family register;

FIG. 15 is a diagram illustrating an example of a certificate of family register;

FIG. 16 is a flowchart illustrating the flow of a process according to Example 1 of a second exemplary embodiment;

FIG. 17 is a flowchart illustrating the flow of a process according to Example 2 of the second exemplary embodiment;

FIG. 18 is a flowchart illustrating the flow of a process according to Example 3 of the second exemplary embodiment;

FIG. 19 is a diagram illustrating an example of a certificate of family register;

DETAILED DESCRIPTION

First Exemplary Embodiment

Figure 1:
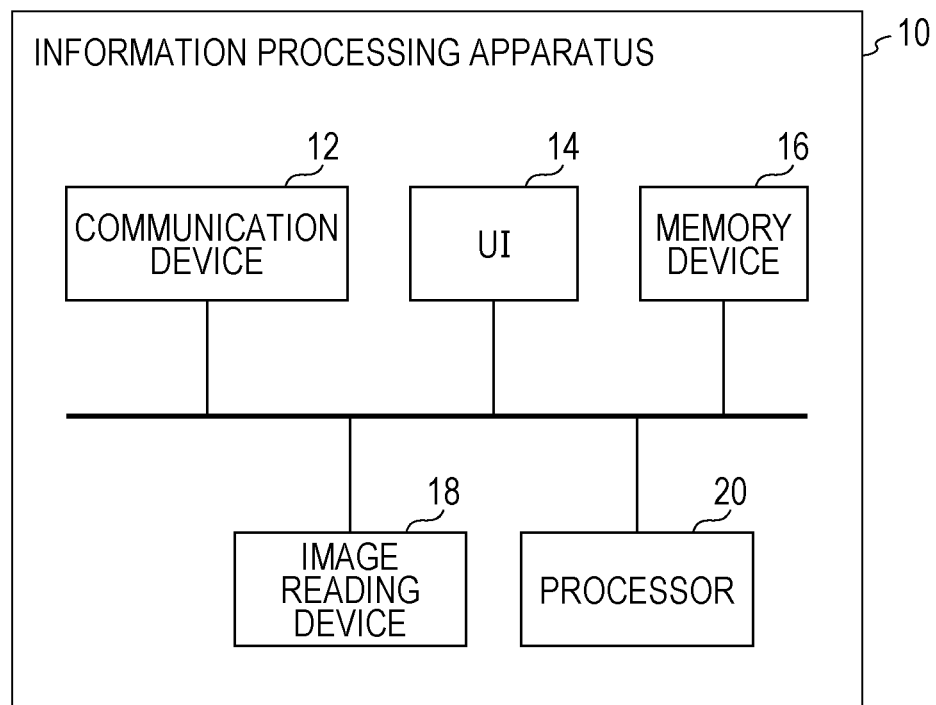
FIG. 1 is a block diagram illustrating a configuration of an information processing apparatus according to a first exemplary embodiment.

An information processing apparatus 10 according to a first exemplary embodiment will be described with reference to FIG. 1. FIG. 1 illustrates an example of a hardware configuration of the information processing apparatus 10.

The information processing apparatus 10 includes, for example, a communication device 12, a user interface (UI) 14, a memory device 16, an image reading device 18, and a processor 20. Obviously, the information processing apparatus 10 may include components different from those mentioned above.

The communication device 12 is a communication interface and includes a function for transmitting data to other apparatuses and a function for receiving data transmitted from other apparatuses. The communication device 12 may include a wireless communication function or a wired communication function. The communication device 12 may communicate with other apparatuses using a communication path through wireless communication or wired communication. The communication path is, for example, a network such as a local area network (LAN) or the Internet. The communication device 12 may communicate with other apparatuses through short-range wireless communication or the like. The short-range wireless communication is, for example, Bluetooth®, radio frequency identifier (RFID), near-field communication (NFC), or the like.

The UI 14 is a user interface and includes a display unit and an operation unit. The display unit is a liquid crystal display, an electroluminescent (EL) display, or the like. The operation unit is, a keyboard, an input key, an operation panel, or the like. The UI 14 may be a UI such as a touch panel including the display unit and the operation unit.

The memory device 16 is a device that configures one or more memory regions in which various data are stored. The memory device 16 is, for example, a hard disk drive, various memories (for example, a random access memory (RAM), a dynamic random access memory (DRAM), a read only memory (RON), or the like), other types of memory devices (for example, an optical disc), or a combination of these memory devices. The information processing apparatus 10 includes one or more memory devices 16.

The image reading device 18 is a device that is configured to read image data. The image reading device 18 may be an image scanner, a facsimile, or a photographing device such as a camera. The image scanner is a device that is configured to optically scan a reading target to generate image data representing the reading target. The photographing device is a device that is configured to photograph a reading target to generate image data representing the reading target. The reading target is, for example, a document. The image reading device 18 scans or photographs a document and thus generates image data representing the document. The document mentioned herein is not necessarily paper on which characters are written or printed. Any type of substance on which a document is written or printed is regarded as a document. For example, a character string may be printed on a curved surface of a substance, and image data representing the character string may be generated. The documents are, for example, various certificates such as certificates of family register and residence certificates, various slips (for example, slips used for home delivery services), and the like. Obviously, concepts of documents may encompass other types of substances.

The processor 20 is configured to perform cleansing processing for image data. The cleansing processing is processing for generating image data not representing information of a deletion target out of information represented in image data but representing information other than the information of the deletion target. The cleansing processing may be processing for deleting information of a deletion target from image data to generate image data not representing the information of the deletion target but representing information other than the information of the deletion target or processing for extracting information other than information of a deletion target from image data to generate image data representing the extracted information. In the cleansing processing, image data may be processed so that image data not representing information of a deletion target but representing information other than the information of the deletion target may be generated. In terms of generating image data not representing information of a deletion target but representing information other than the information of the deletion target, the cleansing processing may be regarded as filter processing. Information represented in image data is, for example, characters, diagrams other than characters (for example, lines, frames, etc.), and the like represented in the image data.

Image data as a target for cleansing processing is image data representing a document. Such image data may be image data generated by the image reading device 18, image data transmitted from an apparatus different from the information processing apparatus 10 to the information processing apparatus 10 and received by the communication device 12, or image data stored in a portable storing medium (for example, an optical disc) and input from the storing medium to the information processing apparatus 10.

The image reading device 18 may not be provided in the information processing apparatus 10. In this case, the processor 20 performs cleansing processing for image data received by the communication device 12 or image data input from a portable storing medium to the information processing apparatus 10.

Image data as a target for cleansing processing may be data having a bitmap (BMP) format, a joint photographic experts group (JPEG) format, a portable document format (PDF), or the like or may be text data.

For example, the cleansing processing is preprocessing performed before character recognition processing. The character recognition processing is processing for recognizing a character from image data. The cleansing processing is, for example, processing performed so that a character is able to be easily recognized from image data. For example, character recognition processing is performed for image data that has been subjected to cleansing processing. For example, OCR processing is employed as the character recognition processing. For example, OCR processing is performed for a document so that a character may be recognized from the document.

Information of a deletion target is information other than information of characters to be recognized by character recognition processing. Information of a deletion target is, for example, information that may change according to the type of a document represented in image data, the period in which the document is created, the person who creates the document, the purpose of the document, and the like.

Hereinafter, image data that has not been subjected to cleansing processing will be referred to as "first image data", and image data that has been subjected to cleansing processing will be referred to as "second image data."

The processor 20 performs cleansing processing corresponding to specific information other than information of a deletion target out of information represented in first image data representing a document to generate second image data not representing the information of the deletion target out of the information represented in the first image data but representing information other than the information of the deletion target. That is, the processor 20 changes cleansing processing according to specific information other than information of a deletion target and performs the cleansing processing for first image data. The processor 20 may change a method for cleansing processing (for example, an algorithm for cleansing processing) or an engine for cleansing processing according to specific information. The scope of the concept of an engine for cleansing processing may encompass a cleansing learning device that implements cleansing processing by artificial intelligence. For example, in a certificate of family register, which is an example of a document, for the purpose of forgery protection, copy protection, and the like, a background pattern such as a watermark character or watermark diagram may be provided. By performing cleansing processing for first image data representing a certificate of family register, a background pattern is deleted from the image data, but character strings and diagrams such as frames other than the background pattern are not deleted. That is, second image data not representing a background pattern but representing character strings and diagrams such as frames other than the background pattern is generated.

For example, for each piece of specific information, the specific information and cleansing processing are linked with each other, and the processor 20 performs, for first image data, cleansing processing linked with the specific information represented in the first image data.

The specific information is information related to the information of the deletion target. For example, information corresponding to characteristics of the information of the deletion target, information corresponding to an item associated with the information of the deletion target, information reflecting the characteristics of the information of the deletion target, information reflecting the item associated with the information of the deletion target, or the like may be defined as the specific information. The specific information may be information that may change according to the information of the deletion target. That is, the specific information may be information that differs according to information of a deletion target. Characteristics of information of a deletion target and an item associated with the information of the deletion target may change according to the information of the deletion target. Information of a deletion target represents information that may change according to the type of a document represented in image data, the period in which the document is created, the person who creates the document, the purpose of the document, and the like. Therefore, specific information associated with the information of the deletion target also represents information that may change according to the type of the document, the period in which the document is created, the person who creates the document, the purpose of the document, and the like.

The specific information is, for example, a specific character string written in a document represented in first image data. The specific character string is, for example, a specific keyword, a combination of a plurality of specific keywords, or the like. The specific character string is a character string corresponding to characteristics of information of a deletion target, a character string corresponding to an item associated with the information of the deletion target, a character string reflecting the characteristics of the information of the deletion target, a character string reflecting the item associated with the information of the deletion target, or the like. The specific character string is a character string that may change according to information of a deletion target. For example, a keyword, which is the specific character string, a combination of a plurality of keywords, or the like, may change according to the information of the deletion target.

The specific character string may be a character string written in a specific position in a document represented in first image data. The specific position is a position at which a specific character string that may change according to information of a deletion target is estimated to be written.

Furthermore, the specific information may be a corresponding character string corresponding to a specific character string represented in first image data. The corresponding character string is, for example, a character string written near a specific character string.

The processor 20 may change cleansing processing according to an attribute associated with a specific character string. The attribute is, for example, a position at which a specific character string is written in a document represented in first image data. The position is, for example, a position corresponding to characteristics of information of a deletion target, a position corresponding to an item associated with the information of the deletion target, a position in which the characteristics of the information of the deletion target are reflected, a position in which the item associated with the information of the deletion target is reflected, or the like. The position may change according to information of a deletion target.

Furthermore, the processor 20 may perform character recognition processing for image data to recognize a character from the image data. For example, the processor 20 performs character recognition processing for second image data mentioned above to recognize a character from the second image data. The character recognition processing may be implemented by a learning device using artificial intelligence.

The character recognition processing may be performed by apparatuses (for example, a server, a personal computer (hereinafter, referred to as a "PC"), or the like) other than the information processing apparatus 10. For example, the information processing apparatus 10 may perform cleansing processing to generate second image data, the second image data may be transmitted to a different apparatus, the different apparatus may perform character recognition processing for the second image data, and a character may be recognized from the second image data.

The information processing apparatus 10 may be an image scanner, an image forming apparatus (for example, a multifunction apparatus) that includes an image scanner, a printer, and the like, or an apparatus (for example, a PC, a tablet PC, a smartphone, a cellular phone, or other apparatuses) that does not include an image scanner but includes a camera. Obviously, as described above, the information processing apparatus 10 may be an apparatus (for example, a PC) that does not include the image reading device 18 such as an image scanner or a camera.

In the description provided below, the information processing apparatus 10 includes the image reading device 18 and a character recognition function. That is, the information processing apparatus 10 is configured to scan or photograph a document to generate image data and recognize a character from the image data.

Figure 2:
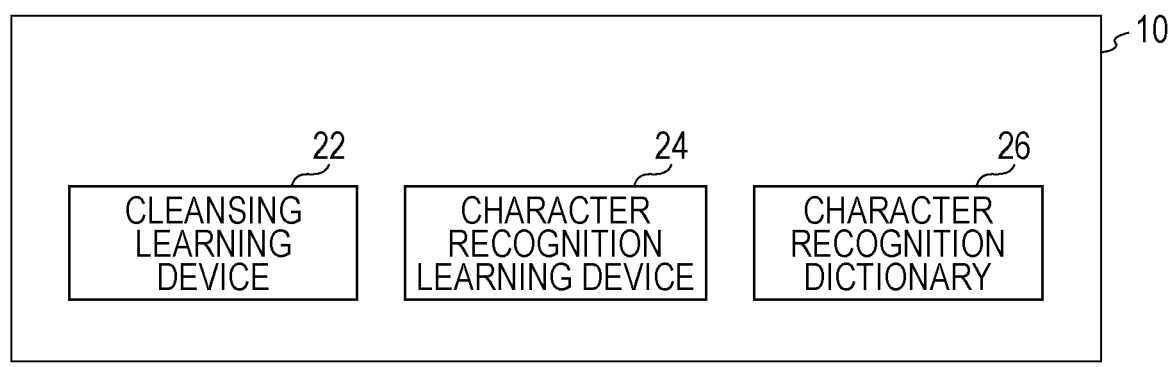
FIG. 2 is a block diagram illustrating some of functions of the information processing apparatus according to the first exemplary embodiment.

Some of functions of the information processing apparatus 10 will be described below with reference to FIG. 2. FIG. 2 illustrates some of functions of the information processing apparatus 10. The functions illustrated in FIG. 2 are a function for cleansing processing and a function for character recognition processing.

The information processing apparatus 10 includes a cleansing learning device 22, a character recognition learning device 24, and a character recognition dictionary 26. The cleansing learning device 22 is configured to perform cleansing processing. The character recognition learning device 24 is configured to perform character recognition processing. The character recognition dictionary 26 is data of a dictionary in which characters to be used for character recognition processing are registered. Specifically, the character recognition dictionary 26 is data of a dictionary in which characters to be compared with characteristics of characters extracted from image data are registered so that characters are able to be recognized from the image data. The character recognition dictionary 26 may be included in the character recognition learning device 24.

The cleansing learning device 22 and the character recognition learning device 24 may be, for example, implemented by artificial intelligence. In this case, the cleansing learning device 22 performs different cleansing processing depending on the contents learned by artificial intelligence. In a similar manner, the character recognition learning device 24 performs different character recognition processing depending on the contents learned by artificial intelligence. An algorithm used for artificial intelligence is not particularly limited, and any algorithm may be used. For example, machine learning is used as an algorithm. Learning with a teacher, learning without a teacher, or reinforcement learning may be used as machine learning. Specifically, deep learning (for example, a multilayer perceptron, a convolutional neural network, a recurrent neural network, an autoencoder, a restricted Boltzmann machine, or the like), a perceptron, a backpropagation, an associatron, a support vector machine, a decision tree, a k-nearest neighbor algorithm, a linear regression, a self-organizing map, a Boltzmann machine, a principal component analysis, a cluster analysis, Q-learning, or the like may be used. A genetic algorithm, hill climbing, or the like may be used as an algorithm other than machine learning. Obviously, other algorithms may be used.

In the first exemplary embodiment, the information processing apparatus 10 includes a plurality of different cleansing learning devices 22. The cleansing learning devices 22 perform different types of cleansing processing. For example, the cleansing learning devices 22 may differ according to the types of documents, differ according to the periods in which the documents are created, differ according to the people who create the documents, or differ according to the purposes of the documents.

For example, a cleansing learning device 22 that is used for a type of document is a cleansing learning device dedicated to the type of document and is configured to generate, from first image data representing the type of document, second image data not representing information of a deletion target included in the type of document but representing information other than the information of the deletion target. In the case where the cleansing learning device 22 is implemented by artificial intelligence, the artificial intelligence implementing the cleansing learning device 22 is configured to learn to generate second image data not representing information of a deletion target included in the type of document but representing information other than the information of the deletion target.

A specific example will be described below. The cleansing learning device 22 for certificates of family register as documents is a cleansing learning device dedicated to certificates of family register. The cleansing learning device 22 for certificates of family register is configured to generate, from first image data representing a certificate of family register, second image data not representing information of a deletion target included in the certificate of family register but representing information other than the information of the deletion target. In the case where the cleansing learning device 22 for certificates of family register is implemented by artificial intelligence, the artificial intelligence implementing the cleansing learning device 22 for certificates of family register is configured to learn to generate second image data not representing information of a deletion target included in a certificate of family register but representing information other than the information of the deletion target.

Furthermore, the cleansing learning device 22 for slips as documents is a cleansing learning device dedicated to slips. The cleansing learning device 22 for slips is configured to generate, from first image data representing a slip, second image data not representing information of a deletion target included in the slip but representing information other than the information of the deletion target. In the case where the cleansing learning device 22 for slips is implemented by artificial intelligence, the artificial intelligence implementing the cleansing learning device 22 for slips is configured to learn to generate second image data not representing information of a deletion target included in a slip but representing information other than the information of the deletion target.

Furthermore, the cleansing learning devices 22 are cleansing learning devices that differ according to the information of deletion targets. For example, the different cleansing learning devices 22 are created for specific types of information associated with information of deletion targets, and specific information associated with information of a deletion target that will not be represented by the cleansing learning device 22 is linked with the cleansing learning device 22. A cleansing learning device 22 linked with specific information is a cleansing learning device dedicated to information of a deletion target associated with the specific information.

Examples of the first exemplary embodiment will be described below.

Example 1 of First Exemplary Embodiment

Example 1 of the first exemplary embodiment will be explained with reference to FIG. 3. FIG. 3 is a flowchart illustrating the flow of a process according to Example 1 of the first exemplary embodiment.

First, the image reading device 18 reads a document, and generates first image data representing the document (S01).

Next, the processor 20 extracts specific information (for example, a keyword) from the first image data (S02). For example, the processor 20 performs image correction, binarization, layout analysis, table structure analysis, and the like for the first image data to perform simple character recognition processing for extracting the specific information. Accordingly, the processor 20 extracts the specific information from the first image data. The simple character recognition processing is, for example, character recognition processing whose character recognition accuracy is not as high as character recognition processing performed by the character recognition learning device 24 but whose degree of accuracy is high enough to be able to extract specific information.

Next, the processor 20 selects, from among the plurality of cleansing learning devices 22, a cleansing learning device 22 that is dedicated to the type of the read document and linked with the specific information extracted from the first image data (S3). That is, the processor 20 selects the cleansing learning device 22 dedicated to information of a deletion target associated with the specific information extracted from the first image data. A user may operate the UI 14 to specify the type of the document or the processor 20 may analyze the first image data to identify the type of the document.

Next, the processor 20 performs cleansing processing for the first image data using the cleansing learning device 22 selected in S03 (S04). Accordingly, second image data not representing information of the deletion target but representing information other than the information of the deletion target is generated.

Next, the processor 20 performs character recognition processing for the second image data using the character recognition learning device 24 (S05). The character recognition learning device 24 recognizes a character from the second image data by, for example, analyzing the layout of the document represented in the second image data, extracting a row and a column from the document, extracting a character from the extracted row and column, normalizing the extracted character, extracting characteristics of the normalized character, and comparing characteristics of a character registered in the character recognition dictionary 26 with the extracted characteristics of the character. Furthermore, the character recognition learning device 24 may perform knowledge processing for analyzing the meaning of a character string. The character recognition processing may be performed by an apparatus different from the information processing apparatus 10.

A specific example of Example 1 of the first exemplary embodiment will be described below. In Example 1 of the first exemplary embodiment, a specific keyword or a combination of a plurality of specific keywords written in a document as a reading target is used as specific information. The processor 20 selects a cleansing learning device 22 corresponding to the specific keyword or the combination of the plurality of specific keywords and performs cleansing processing.

In this example, for example, a document as a reading target is a certificate of family register, and cleansing processing is performed for image data representing the certificate of family register.

Forms of family registers will be explained below. Forms of family registers include family registers in the Year 1994 version, family registers in the Year 1948 version, family registers in the Year 1915 version, and family registers in the Year 1898 version. Family registers in the Year 1886 version may also be used. However, explanation for the Year 1886 version will be omitted here. Hereinafter, certificates of family register based on the form of the Year 1994 version will be referred to as "certificates of Year 1994 version family register", certificates of family register based on the form of the Year 1948 version will be referred to as "certificates of Year 1948 version family register", certificates of family register based on the form of the Year 1915 version will be referred to as "certificates of Year 1915 version family register", certificates of family register based on the form of the Year 1898 version will be referred to as "certificates of Year 1898 version family register".

In general, the Year 1994 version family registers are created by typing, the Year 1948 version family registers are created by typing or handwriting, the Year 1915 version family registers are created by typing or handwriting, and the Year 1898 version family registers are created by typing or handwriting. Obviously, certificates of family register different from those mentioned above may be used in some local governments (for example, prefectures, cities, towns, villages, etc.) that issue certificates of family register.

FIG. 4 illustrates an example of a certificate of Year 1994 version family register. A certificate of Year 1994 version family register 28 illustrated in FIG. 4 is merely an example of general certificates of Year 1994 version family register. Forms of certificates of family register may slightly differ according to local governments (for example, prefectures, cities, towns, villages, etc.) that issue certificates of family register. However, a basic form of certificates of Year 1994 version family register is the same as the form of the certificate of Year 1994 version family register 28.

The certificate of Year 1994 version family register 28 basically includes an entry field 28a in which a registered domicile and the full name of the head of a family are written, an entry field 28b in which matters of the family register are written, an entry field 28c in which the name and so on of a person who has been removed from the family register are written, an entry field 28d in which the name and so on of a person who is recorded in the family register are written, an entry field 28e in which matters of the personal status are written, an entry field 28f in which wording should be written by a local government, and so on.

In the entry field 28b, a character string "Revision of Family Register pursuant to Article 2, paragraph 1 of Supplementary Provisions, Ordinance of the Ministry of Justice No. 51 of 1994" is written on the right of a character string "Reason of Revision", as illustrated by a sign 28g.

In the entry field 28c in which the name and so on of a person who has been removed from the family register are written, a removal mark 28h representing "removed" is written below a character string "a person recorded in the family register".

In the entry field 28c and so on, a character string "relationship" is written, as indicated by a sign 28i.

In the entry field 28f, a character string "number of issue" is written, as indicated by a sign 28j, and a number is written on the right of the character string "number of issue".

As indicated by a sign 28m, a character string representing an address is written on the right of a character string "registered domicile" indicated by a sign 28k.

In the certificate of Year 1994 version family register 28, the direction in which characters are written is from the left to the right.

FIG. 5 illustrates an example of a certificate of Year 1948 version family register. A certificate of Year 1948 version family register 30 illustrated in FIG. 5 is merely an example of general certificates of Year 1948 version family register. Forms of certificates of family register may slightly differ according to local governments (for example, prefectures, cities, towns, villages, etc.) that issue certificates of family register. However, a basic form of certificates of Year 1948 version family register is the same as the form of the certificate of Year 1948 version family register 30.

The certificate of Year 1948 version family register 30 basically includes a margin display 30a, an entry field 30b in which a registered domicile and the full name of the head of a family are written, an entry field 30c in which matters of the family register are written, an entry field 30d in which matters of the personal status are written, an entry field 30e in which the name of the head of the family is written, an entry field 30f in which matters of the personal status of a family member are written, an entry field 30g in which wording should be written by a local government, and so on.

In an entry field in which the name of a person who has been removed from the family register is written, a cross mark is provided. For example, a person whose name is written in the entry field 30e has been removed from the family register. Therefore, a cross mark indicated by a sign 30h is provided in the entry field 30e.

As indicated by a sign 30i, a character string "name full" is written. Furthermore, in the entry field 30b, a character string representing an address is written below a character string "domicile registered", as indicated by a sign 30j.

In the certificate of Year 1948 version family register 30, the direction in which characters are written is from the top to the bottom. Furthermore, the entire certificate of Year 1948 version family register 30 has a shape of A4 landscape.

FIG. 6 illustrates an example of a certificate of Year 1915 version family register. A certificate of Year 1915 version family register 32 illustrated in FIG. 6 is merely an example of general certificates of Year 1915 version family register. Forms of certificates of family register may slightly differ according to local governments (for example, prefectures, cities, towns, villages, etc.) that issue certificates of family register. However, a basic form of certificates of Year 1915 version family register is the same as the form of the certificate of Year 1915 version family register 32.

The certificate of Year 1915 version family register 32 basically includes a margin display 32a, an entry field 32b in which an address of registered domicile and the full name of the former head of a family are written, an entry field 32c in which a character string "head of the family" is written, an entry field 32d in which matters of the head of the family are written, an entry field 32e in which the name of the head of the family is written, an entry field 32f in which matters of a family member are written, an entry field 32g in which wording should be written by a government office, and so on.

As indicated by a sign 32h, a character string representing an address is written below a character string "domicile registered", and a character string "family the of head former" is written below the character string representing the address, as indicated by a sign 32i. As described above, in the certificate of Year 1915 version family register 32, the full name of the first person written in the family register is referred to as a "former head of the family". Furthermore, a family head is referred to as a "head of the family".

In general, the number of hiragana letters in a certificate of Year 1915 version family register is smaller than that in a certificate of Year 1948 version family register or that in a certificate of Year 1994 version family register.

FIG. 7 illustrates an example of a certificate of Year 1898 version family register. A certificate of Year 1898 version family register 34 illustrated in FIG. 7 is merely an example of general certificates of Year 1898 version family register. Forms of certificates of family register may slightly differ according to local governments (for example, prefectures, cities, towns, villages, etc.) that issue certificates of family register. However, a basic form of certificates of Year 1898 version family register is the same as the form of the certificate of Year 1898 version family register 34.

The certificate of Year 1898 version family register 34 basically includes an entry field 34a in which the address of a registered domicile and the full name of the former head of a family are written, an entry field 34b in which a character string "head of the family" is written, an entry field 34c in which matters of the head of the family are written, an entry field 34d in which the full name of the head of the family is written, an entry field 34e in which matters of a family member are written, and so on.

As indicated by a sign 34f, a character string representing an address is written below a character string "domicile registered of address", and a character string "family the of head former" is written below the character string representing the address, as indicated by a sign 34g. As described above, in the certificate of Year 1898 version family register 34, the full name of the first person written in the family register is referred to as a "former head of the family". Furthermore, a family head is referred to as a "head of the family".

As indicated by a sign 34h, a character string "a ground that a person became the head of the family, and date" is written on the left of the entry field 34d in which the full name of the head of the family is written, and the ground that the person became the head of the family and the date are written in the field. Furthermore, traditional forms of kanji (Chinese characters used in Japanese) may be used. For example, a traditional character for the character "prefecture" is used.

In general, the number of hiragana letters in a certificate of Year 1898 version family register is smaller than that in a certificate of Year 1915 version family register. In general, no hiragana letter is used in an upper part of a certificate of Year 1898 version family register, and a hiragana letter is used in part of full names written in a lower part of the certificate of Year 1898 version family register.

For the purpose of forgery protection, copy protection, and the like, a background pattern such as a watermark character or watermark diagram may be provided in the background of a certificate of family register. A background pattern may cause a reduction in the ratio of recognition of characters other than the background pattern. Therefore, the background pattern corresponds to an example of information as a deletion target. Furthermore, a specific keyword or a combination of a plurality of specific keywords other than the background pattern is used as specific information.

As illustrated in FIGS. 4 to 7, structures of certificates of family register and the contents written in certificates of family register differ according to the periods in which the certificates of family register are created. Furthermore, background patterns also differ according to the periods in which the certificates of family register in which the background patterns are provided are created. By extracting a specific keyword or a combination of specific keywords reflecting a period in which a certificate of family register is created, the period in which the certificate of family register is created is able to be estimated. That is, a certificate of family register as a reading target is estimated to be a certificate of Year 1994 version family register, a certificate of Year 1948 version family register, a certificate of Year 1915 version family register, or a certificate of Year 1898 version family register. Keywords written in certificates of family register will be explained below.

As illustrated in FIG. 4, in the certificate of Year 1994 version family register 28, as indicated by the sign 28k, a character string "registered domicile" is written, and a character string "full name" is written below the character string "registered domicile".

As illustrated in FIG. 5, in the entry field 30b of the certificate of Year 1948 version family register 30, a character string "domicile registered" is written, and a character string "name full" is written below a character string representing an address written below the character string "domicile registered".

As illustrated in FIG. 6, in the entry field 32b of the certificate of Year 1915 version family register 32, a character string "domicile registered" is written, and a character string "family the of head former" is written below a character string representing an address written below the character string "domicile registered".

As illustrated in FIG. 7, in the entry field 34a of the certificate of Year 1898 version family register 34, a character string "domicile registered of address" is written, and a character string "family the of head former" is written below a character string representing an address written below the character string "domicile registered of address".

By comparing the above-mentioned character strings written in the certificates of family register, it becomes clear that there are differences among the character strings. The character strings in the certificates of family register are as below:

Certificates of Year 1994 version family register: a character string "registered domicile" and a character string "full name"

Certificates of Year 1948 version family register: a character string "domicile registered" and a character string "name full"

Certificates of Year 1915 version family register: a character string "domicile registered" and a character string "family the of head former"

Certificates of Year 1898 version family register: a character string "domicile registered of address" and a character string "family the of head former"

That is, a combination of the character string "registered domicile" and the character string "full name" may be regarded as a combination of a plurality of specific keywords reflecting a period for the certificate of Year 1994 version family register 28.

Furthermore, a combination of the character string "domicile registered" and the character string "name full" may be regarded as a combination of a plurality of specific keywords reflecting a period for the certificate of Year 1948 version family register 30.

Furthermore, a combination of the character string "domicile registered" and the character string "family the of head former" may be regarded as a combination of a plurality of specific keywords reflecting a period for the certificate of Year 1915 version family register 32.

Furthermore, a combination of the character string "domicile registered of address" and the character string "family the of head former" may be regarded as a combination of a plurality of specific keywords reflecting a period for the certificate of Year 1898 version family register 34.

As described above, specific keywords differ according to periods for certificates of family register. Therefore, based on a specific keyword or a combination of a plurality of specific keywords extracted from first image data representing a certificate of family register as a reading target, a period for the certificate of family register is estimated.

The processor 20 selects a cleansing learning device 22 corresponding to a specific keyword or a combination of a plurality of specific keywords extracted from first image data, and performs cleansing processing using the selected cleansing learning device 22.

The cleansing learning device 22 corresponding to the specific keyword or the combination of the plurality of specific keywords extracted from the first image data is the cleansing learning device 22 dedicated to the certificate of family register from which the specific keyword or the combination of the plurality of specific keywords is extracted. The specific keyword or the combination of the plurality of specific keywords is a character string reflecting the period for the certificate of family register. Therefore, the cleansing learning device 22 dedicated to the certificate of family register may be regarded as a cleansing learning device dedicated to the period for the certificate of family register. The cleansing learning device 22 dedicated to the period for the certificate of family register is a cleansing learning device that is configured to learn to generate, from the first image data representing the certificate of family register, second image data not representing a background pattern but representing information other than information of the background pattern.

Figure 8:
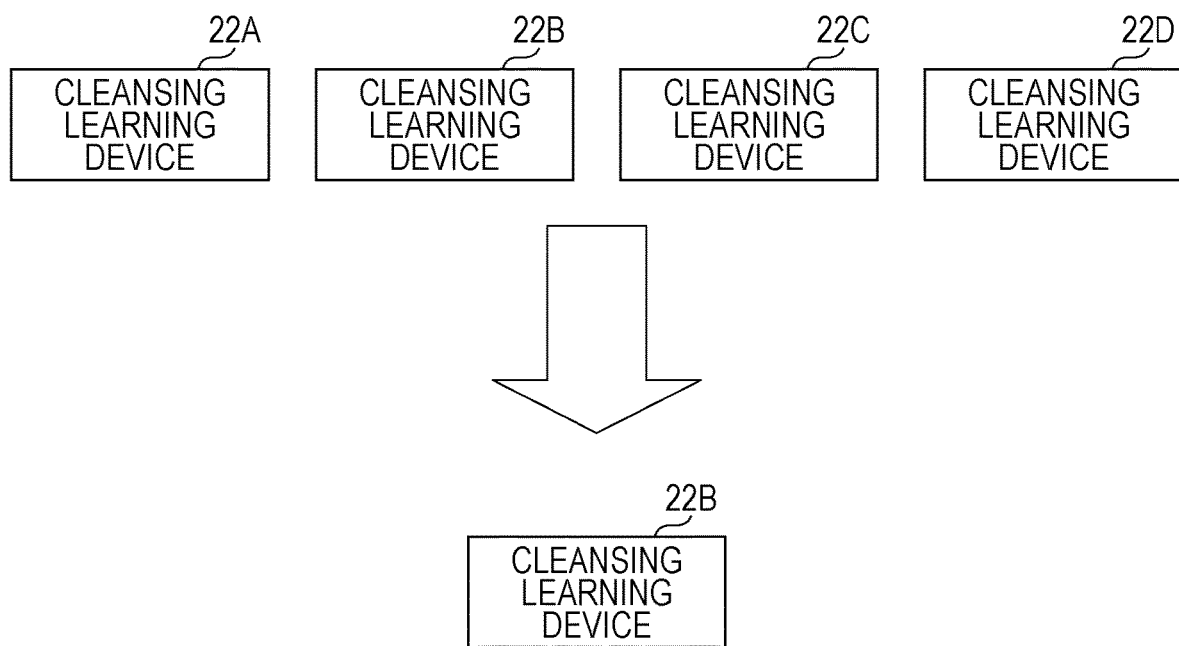
FIG. 8 is a diagram illustrating cleansing learning devices.

FIG. 8 illustrates cleansing learning devices 22 dedicated to certificates of family register for various periods.

A cleansing learning device 22A is a cleansing learning device dedicated to a certificate of Year 1994 version family register. A combination of a character string "registered domicile" and a character string "full name", which is a combination of a plurality of specific keywords, is linked in advance with the cleansing learning device 22A.

A cleansing learning device 22B is a cleansing learning device dedicated to a certificate of Year 1948 version family register. A combination of a character string "domicile registered" and a character string "name full", which is a combination of a plurality of specific keywords, is linked in advance with the cleansing learning device 22B.

A cleansing learning device 22C is a cleansing learning device dedicated to a certificate of Year 1915 version family register. A combination of a character string "domicile registered" and a character string "family the of head former", which is a combination of a plurality of specific keywords, is linked in advance with the cleansing learning device 22C.

A cleansing learning device 22D is a cleansing learning device dedicated to a certificate of Year 1898 version family register. A combination of a character string "domicile registered of address" and a character string "family the of head former", which is a combination of a plurality of specific keywords, is linked in advance with the cleansing learning device 22D.

For example, shapes, sizes, positions, and the like of background patterns differ according to periods for certificates of family register. Therefore, by causing the cleansing learning devices 22 dedicated to the certificates of family register for the periods to learn the shapes, sizes, positions, and the like of the background patterns provided in the corresponding periods for the certificates of family register, the cleansing learning devices 22 are able to generate, from first image data representing the certificates of family register for the periods, second image data not representing the background patterns but representing information other than information of the background patterns. The cleansing learning devices 22 may delete the background patterns to generate the second image data or may extract information other than the information of the background patterns from the first image data to generate the second image data representing the extracted information.

For example, the cleansing learning device 22A is a cleansing learning device that learns in advance the shape, size, position, and the like of a background pattern provided in a certificate of Year 1994 version family register and learns in advance to generate, from first image data representing the certificate of Year 1994 version family register, second image data not representing the background pattern but representing information other than information of the background pattern.

In a similar manner, the cleansing learning device 22B is a cleansing learning device that learns in advance the shape, size, position, and the like of a background pattern provided in a certificate of Year 1948 version family register and learns in advance to generate, from first image data representing the certificate of Year 1948 version family register, second image data not representing the background pattern but representing information other than information of the background pattern.

In a similar manner, the cleansing learning device 22C is a cleansing learning device that learns in advance the shape, size, position, and the like of a background pattern provided in a certificate of Year 1915 version family register and learns in advance to generate, from first image data representing the certificate of Year 1915 version family register, second image data not representing the background pattern but representing information other than information of the background pattern.

In a similar manner, the cleansing learning device 22D is a cleansing learning device that learns in advance the shape, size, position, and the like of a background pattern provided in a certificate of Year 1898 version family register and learns in advance to generate, from first image data representing the certificate of Year 1898 version family register, second image data not representing the background pattern but representing information other than information of the background pattern.

For example, each of the cleansing learning devices 22 learns in advance to generate second image data representing at least a character other than a background pattern. Depending on the degree of learning, teacher data used for learning, and the like of each of the cleansing learning devices 22, ruled lines or the like, which are information other than characters, may be represented in the second image data. Furthermore, depending on the degree of learning, teacher data used for learning, and the like of each of the cleansing learning devices 22, information other than information of the base or background (for example, dirt on a character) may be removed.

An example of a process will be explained below with reference to FIG. 9. FIG. 9 illustrates the certificate of Year 1915 version family register 32. The certificate of Year 1915 version family register 32 is a document as a reading target. A background pattern 32j is printed in the certificate of Year 1915 version family register 32. The background pattern 32j includes a plurality of character strings "copy prohibited". Each of the character strings "copy prohibited" is, for example, a watermark.

First, the image reading device 18 reads the certificate of Year 1915 version family register 32 including the background pattern 32j superimposed thereon. Thus, first image data representing the certificate of Year 1915 version family register 32 including the background pattern 32j superimposed thereon is generated.

Next, the processor 20 performs image correction, binarization, layout analysis, table structure analysis, and the like to perform simple character recognition processing. Accordingly, the processor 20 extracts a specific keyword or a plurality of specific keywords from the first image data.

For example, in the case where a character string "domicile registered" represented by a sign 32k and a character string "family the of head former" represented by a sign 32m are extracted, the certificate of family register as the reading target is estimated to be the certificate of Year 1915 version family register 32.

Next, as illustrated in FIG. 8, the processor 20 selects, from among the cleansing learning devices 22A, 22B, 22C, and 22D, the cleansing learning device 22C that is linked with the combination of the character string "domicile registered" and the character string "family the of head former", which is a combination of a plurality of specific keywords. Accordingly, the cleansing learning device 22C dedicated to the certificate of Year 1915 version family register 32 is selected.

The processor 20 performs cleansing processing using the cleansing learning device 22C for the first image data to generate second image data. The second image data generated as described above is image data not representing the background pattern 32j but representing characters other than the background pattern 32j. For example, as illustrated in FIG. 6, second image data representing the certificate of Year 1915 version family register 32 not including the background pattern 32j is generated. Depending on the degree of learning, teacher data used for learning, and the like of the cleansing learning device 22C, second image data not representing ruled lines or the like may be generated. Character recognition processing is performed for the second image data generated as described above, and characters are recognized from the second image data not representing the background pattern 32j.

For each of the certificates of family register other than the certificate of Year 1915 version family register 32, in a similar manner, a cleansing learning device 22 that is linked with an extracted specific keyword or an extracted combination of a plurality of specific keywords is selected, and cleansing processing is performed using the selected cleansing learning device 22.

Example 2 of First Exemplary Embodiment

In Example 2 of the first exemplary embodiment, the processor 20 extracts specific information (for example, a keyword) provided at a specific position in a document represented in first image data and performs cleansing processing using a cleansing learning device 22 that is linked with the extracted specific information.

Example 2 of the first exemplary embodiment will be described below by way of specific example. As in the specific example of Example 1 of the first exemplary embodiment, for example, a document as a reading target is a certificate of family register, and specific information is a combination of a plurality of specific keywords reflecting a period for the certificate of family register.

The certificate of Year 1948 version family register 30, the certificate of Year 1915 version family register 32, and the certificate of Year 1898 version family register 34 may have substantially the same structure. However, different keywords may be written in the certificate of Year 1948 version family register 30, the certificate of Year 1915 version family register 32, and the certificate of Year 1898 version family register 34. As explained above in Example 1 of the first exemplary embodiment, combinations of a plurality of specific keywords differ among these certificates of family register.

In Example 2 of the first exemplary embodiment, coordinates at which a plurality of specific keywords are detected are set in advance. The processor 20 detects a combination of the plurality of specific keywords from the coordinates, and performs cleansing processing using a cleansing learning device 22 linked with the combination.

FIGS. 10 to 12 illustrate coordinates at which keywords are detected. FIG. 10 illustrates the certificate of Year 1948 version family register 30, FIG. 11 illustrates the certificate of Year 1915 version family register 32, and FIG. 12 illustrates the certificate of Year 1898 version family register 34.

In each of the certificates of family register, substantially the same coordinates are set as coordinates at which keywords are detected. For example, in the certificate of Year 1948 version family register 30, thick frame regions indicated by sings 30$k$ and 30$m$ are regions in which specific keywords are detected, and coordinates of the regions are set. In the certificate of Year 1915 version family register 32, thick frame regions indicated by signs 32$n$ and 32$p$ are regions in which specific keywords are detected, and coordinates of the regions are set. In the certificate of Year 1898 version family register 34, thick frame regions indicated by signs 34$i$ and 34$j$ are regions in which specific keywords are detected.

For example, in the case where a combination of a character string "domicile registered of address" and a character string "family the of head former" is detected from the coordinates set as described above, a certificate of family register as a reading target is estimated to be the certificate of Year 1898 version family register 34. The processor 20 performs cleansing processing using the cleansing learning device 22D that is liked with the combination of the character string "domicile registered of address" and the character string "family the of head former". A similar procedure is performed for certificates of family register for other periods.

Example 3 of First Exemplary Embodiment

In Example 3 of the first exemplary embodiment, the processor 20 selects a cleansing learning device 22 corresponding to a position at which specific information (for example, a keyword) is written in a document represented in first image data, and performs cleansing processing using the selected cleansing learning device 22.

Example 3 of the first exemplary embodiment will be described below by way of specific example. As in the specific example of Example 1 of the first exemplary embodiment, for example, a document as a reading target is a certificate of family register, and specific information is a specific keyword reflecting a period for the certificate of family register.

As illustrated in FIG. 4, in the certificate of Year 1994 version family register 28, a character string "registered domicile, which is a specific keyword, is written at an upper left position. As illustrated in FIG. 5, in the certificate of Year 1948 version family register 30, a character string "domicile registered", which is a specific keyword, is written at an upper right position. As illustrated in FIG. 6, in the certificate of Year 1915 version family register 32, a character string "domicile registered", which is a specific keyword, is written at an upper right position. As illustrated in FIG. 7, in the certificate of Year 1898 version family register 34, a character string "domicile registered of address", which is a specific keyword, is written at an upper right position. As described above, the position at which a specific keyword is written differs according to the period for the certificate of family register, and the position at which the specific keyword is written reflects the period for the certificate of family register.

The character string "registered domicile" and information indicating a position (for example, an upper left position) at which the character string "registered domicile" is written are linked in advance with the cleansing learning device 22A that is dedicated to certificates of Year 1994 version family register.

The character string "domicile registered" and information indicating a position (for example, an upper right position) at which the character string "domicile registered" is written are linked in advance with the cleansing learning device 22B that is dedicated to certificates of Year 1948 version family register.

The character string "domicile registered" and information indicating a position (for example, an upper right position) at which the character string "domicile registered" is written are linked in advance with the cleansing learning device 22C that is dedicated to certificates of Year 1915 version family register.

The character string "domicile registered of address" and information indicating a position (for example, an upper right position) at which the character string "domicile registered of address" is written are linked in advance with the cleansing learning device 22D that is dedicated to certificates of Year 1898 version family register.

For example, in the case where the character string "registered domicile" is detected from first image data and the position at which the character string "registered domicile" is detected is an upper left position in a certificate of family register represented in the first image data, a certificate of family register as a reading target is estimated to be the certificate of Year 1994 version family register. The processor 20 performs cleansing processing using the cleansing learning device 22A that is liked with the character string "registered domicile" and the upper left position. The same applies to certificates of family register for other periods.

Depending on the position at which a specific keyword is extracted, in a case where a period for a certificate of family register as a reading target is not able to be estimated and a cleansing learning device 22 dedicated to the certificate of family register as the reading target is not able to be selected, the cleansing learning device 22 dedicated to the certificate of family register as the reading target may be selected by combining Example 3 with Example 1 or Example 2 of the first exemplary embodiment.

Example 4 of First Exemplary Embodiment

In Example 4 of the first exemplary embodiment, the processor 20 searches a document represented in first image data for a specific character string, and extracts a corresponding character string corresponding to the specific character string from the first image data. Then, the processor 20 performs cleansing processing using a cleansing learning device 22 corresponding to the corresponding character string. Hereinafter, a specific character string will be referred to as a "key", and a corresponding character string will be referred to as a "value".

Figure 13:
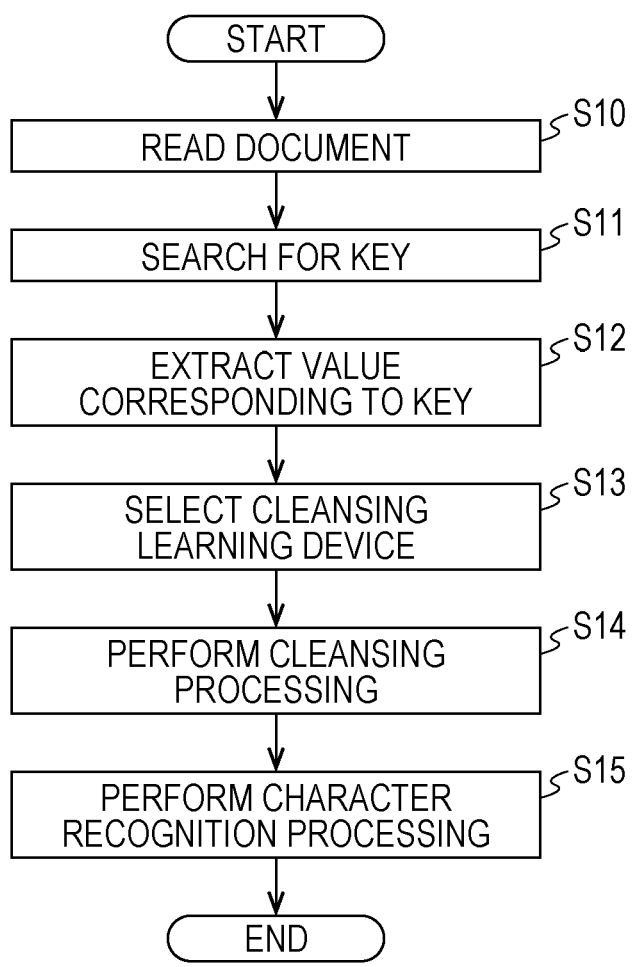
FIG. 13 is a flowchart illustrating the flow of a process according to Example 4 of the first exemplary embodiment.

The flow of a process according to Example 4 of the first exemplary embodiment will be explained below with reference to FIG. 13. FIG. 13 is a flowchart illustrating the flow of a process according to Example 4 of the first exemplary embodiment.

First, the image reading device 18 reads a document, and generates first image data representing the document (S10).

Next, the processor 20 searches the first image data for a key (S11). The key is set in advance. For example, the processor 20 performs image correction, binarization, layout analysis, table structure analysis, and the like for the first image data to perform simple character recognition processing for searching for the key. Accordingly, the processor 20 searches the first image data for the key. The simple character recognition processing is, for example, character recognition processing whose character recognition accuracy is not as high as character recognition processing performed by the character recognition learning device 24 but whose degree of accuracy is high enough to be able to search for a key.

Next, the processor 20 extracts a value corresponding to the key from the first image data (S12). For example, the processor 20 extracts, as a value, a character string written in a region in a predetermined direction relative to a position at which the key is written. For example, a region above, below, on the right, on the left, or the like of a key is set in advance. The processor 20 extracts, as a value, a character string written in a predetermined region. Keys corresponding to values are set such that the values may be extracted as described above.

Next, the processor 20 selects, from among the plurality of cleansing learning devices 22, a cleansing learning device 22 that is dedicated to the type of the read document and liked with the extracted value (S13). A user may operate the UI 14 to identify the type of the document or the processor 20 may analyze the first image data to identify the type of the document.

Next, the processor 20 performs cleansing processing for the first image data using the cleansing learning device 22 selected in S13 (S14). Accordingly, second image data not representing information of a deletion target but representing information other than the information of the deletion target is generated.

Next, the processor 20 performs character recognition processing for the second image data using the character recognition learning device 24 (S15). Accordingly, a character is recognized from the second image data.

A specific example of Example 4 of the first exemplary embodiment will be described below. As in the specific example of Example 1 of the first exemplary embodiment, for example, a document as a reading target is a certificate of family register, and information of a deletion target is a background pattern. A value represents a character string reflecting a local government (for example, a prefecture, a city, a town, a village, etc.) that issues a certificate of family register. For example, a value is a character string representing the name of a local government that issues a certificate of family register.

Background patterns provided in certificates of family register differ according to local governments that issue the certificates of family register. For example, as a background pattern, the name or the like of a local government that issues a certificate of family register may be used. Therefore, background patterns may differ among local governments. By extracting a value, which is a character string reflecting a local government that issues a certificate of family register, the local government that issues the certificate of family register is estimated.

The processor 20 selects a cleansing learning device 22 corresponding to the value, and performs cleansing processing using the selected cleansing learning device 22.

The cleansing learning device 22 corresponding to the value is the cleansing learning device 22 that is dedicated to the certificate of family register from which the value is extracted. The value is a character string reflecting a local government that issues the certificate of family register. Therefore, the cleansing learning device 22 dedicated to the certificate of family register from which the value is extracted may be regarded as a cleansing learning device that is dedicated to a local government that issues the certificate of family register. The cleansing learning device 22 that is dedicated to the certificate of family register is a cleansing learning device that is configured to learn to generate, from the first image data representing the certificate of family register, the second image data not representing the background pattern but representing information other than information of the background pattern.

Figure 14:
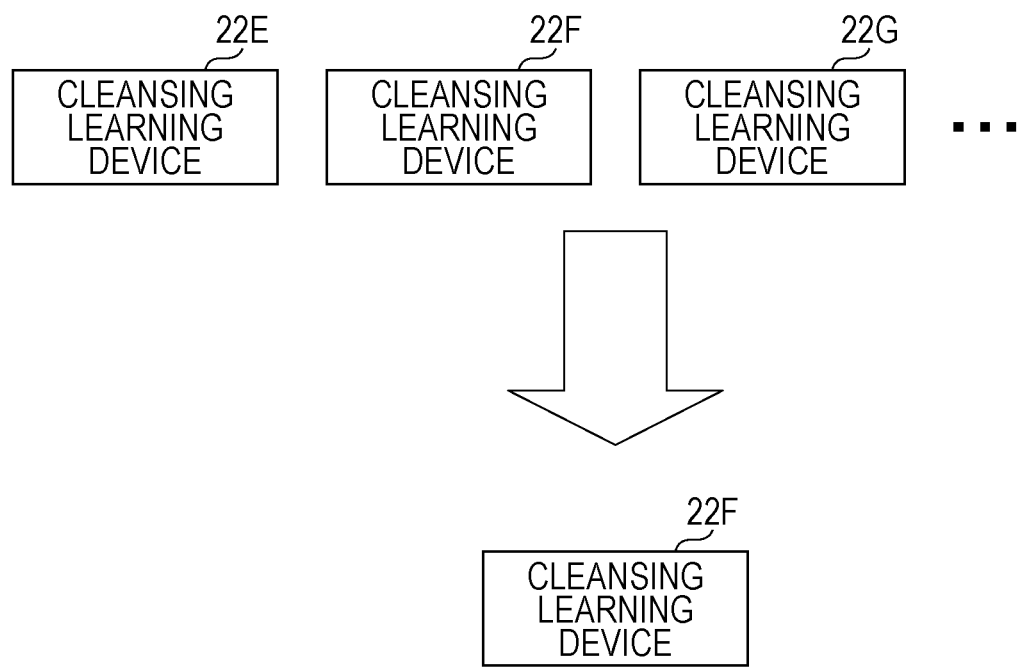
FIG. 14 is a diagram illustrating cleansing learning devices.

FIG. 14 illustrates the cleansing learning devices 22 dedicated to certificates of family register issued by local governments. For example, background patterns differ according to prefectures.

A cleansing learning device 22E is a cleansing learning device that is dedicated to certificates of family register issued in Hokkaido, and a character string "Hokkaido", which is a value, is linked in advance with the cleansing learning device 22E.

A cleansing learning device 22F is a cleansing learning device that is dedicated to certificates of family register issued in Tokyo, and a character string "Tokyo", which is a value, is linked in advance with the cleansing learning device 22F.

A cleansing learning device 22G is a cleansing learning device that is dedicated to certificates of family register issued in Okinawa Prefecture, and a character string "Okinawa Prefecture", which is a value, is linked in advance with the cleansing learning device 22G.

For other prefectures, corresponding cleansing learning devices 22 are prepared in advance in a similar manner.

For example, shapes, sizes, positions, and the like of background patterns differ according to prefectures. Therefore, by causing a cleansing learning device 22 dedicated to a prefecture to learn in advance the shape, size, position, and the like of a background pattern provided in certificates of family register issued in the prefecture, the cleansing learning device 22 is able to generate, from first image data representing a certificate of family register issued in the prefecture, second image data not representing the background pattern but representing information other than information of the background pattern.

For example, the cleansing learning device 22E is a cleansing learning device that learns in advance the shape, size, position, and the like of a background pattern provided in certificates of family register issued in Hokkaido and learns in advance to generate, from first image data representing a certificate of family register issued in Hokkaido, second image data not representing the background pattern but representing information other than information of the background pattern.

In a similar manner, the cleansing learning device 22F is a cleansing learning device that learns in advance the shape, size, position, and the like of a background pattern provided in certificates of family register issued in Tokyo and learns in advance to generate, from first image data representing a certificate of family register issued in Tokyo, second image data not representing the background pattern but representing information other than information of the background pattern.

In a similar manner, the cleansing learning device 22G is a cleansing learning device that learns in advance the shape, size, position, and the like of a background pattern provided in certificates of family register issued in Okinawa Prefecture and learns in advance to generate, from first image data representing a certificate of family register issued in Okinawa Prefecture, second image data not representing the background pattern but representing information other than information of the background pattern.

The same applies to cleansing learning devices 22 dedicated to other prefectures.

For example, each of the cleansing learning devices 22 learns in advance to generate second image data representing at least a character other than a background pattern. Depending on the degree of learning, teacher data used for learning, and the like of each of the cleansing learning devices 22, ruled lines or the like, which are information other than characters, may be represented in the second image data.

An example of a process will be described below with reference to FIG. 15. FIG. 15 illustrates the certificate of Year 1948 version family register 30 issued in Tokyo. The certificate of Year 1948 version family register 30 is a document as a reading target. In the certificate of Year 1948 version family register 30 issued in Tokyo, a background pattern 30n is printed. The background pattern 30n includes a plurality of characters "X". Each of the characters "X" is, for example, a watermark.

First, the image reading device 18 reads the certificate of Year 1948 version family register 30 including the background pattern 30n superimposed thereon. Thus, first image data representing the certificate of Year 1948 version family register 30 including the background pattern 30n superimposed thereon is generated.

Next, the processor 20 performs image correction, binarization, layout analysis, table structure analysis, and the like to perform simple character recognition processing. Accordingly, the processor 20 searches the first image data for a key. For example, the key is a character string "registered domicile", a character string "domicile registered", or a character string "domicile registered of address". The key is set such that a value reflecting a local government (for example, a value representing the name of a local government) may be extracted. It is estimated that a character string representing a local government is written near the character string "registered domicile", the character string "domicile registered", or the character string "domicile registered of address". Therefore, the character string "registered domicile", the character string "domicile registered", or the character string "domicile registered of address" is used as the key.

Next, the processor 20 searches for a value in a region in a predetermined direction relative to the position of the character string "registered domicile", the character string "domicile registered", or the character string "domicile registered of address", which is the key. The region in the predetermined direction is a region in a direction in which a value reflecting a local government is estimated to be written, relative to the position of the key. For example, the processor 20 searches for a value in a region on the right of or below the character string "registered domicile", the character string "domicile registered", or the character string "domicile registered of address".

In the example illustrated in FIG. 15, the character string "domicile registered" indicated by a sign 30p is a key, and the character string "domicile registered" is searched for. Then, a value is searched for in the region on the right or below the character string "domicile registered". In this example, as indicated by a sign 30q, a character string "Tokyo . . . ", which is a value, is found in the region below the character string "domicile registered".

The processor 20 extracts the character string "Tokyo . . . ", which is the value, from the region below the character string "domicile registered". The character string "Tokyo . . . " is included in the character string "Tokyo . . . ", which is the value. Therefore, a certificate of family register as a reading target is estimated to be a certificate of family register issued in Tokyo.

Next, as illustrated in FIG. 14, the processor 20 selects, from among the cleansing learning devices 22E, 22F, 22G, and so on, the cleansing learning device 22F that is linked with the character string "Tokyo" included in the value. Accordingly, the cleansing learning device 22F dedicated to Tokyo is selected.

The processor 20 performs cleansing processing using the cleansing learning device 22F for the first image data to generate the second image data. The second image data generated as described above is image data not representing the background pattern 30n but representing characters other than the background pattern 30n. For example, the second image data representing the certificate of Year 1948 version family register 30 not representing the background pattern 30n is generated. Depending on the degree of learning, teacher data used for learning, and the like of the cleansing learning device 22F, second image data not representing ruled lines or the like may be generated. By performing character recognition processing for the second image data generated as described above, characters are recognized from the second image data not representing the background pattern 30n.

For certificates of family register issued by other local governments, in a similar manner, a value corresponding to a key is extracted, a cleansing learning device 22 that is linked with the value is selected, and cleansing processing is performed.

In the case where a value representing a corresponding character string is a character string representing an old name of an area, the processor 20 performs cleansing processing using a cleansing learning device 22 corresponding to the current name corresponding to the old name.

For example, in the case where a value does not represent the current name of a local government but does represent an old name of the local government, the processor 20 performs cleansing processing using a cleansing learning device 22 corresponding to the current name corresponding to the old name.

Specifically, an old name of a local government is linked in advance with the current name of the local government corresponding to the old name of the local government, and management information (for example, a table) representing the linkage is stored in advance in the memory device 16 or the like. The processor 20 refers to the table to identify the current name corresponding to the extracted old name, and performs cleansing processing using a cleansing learning device 22 that is linked with the current name.

For example, "Shinano", "Awa", and the like are old prefecture names, and a character string representing such an old prefecture name may be extracted as a value. In this case, the processor 20 refers to the above-mentioned table to identify the current prefecture name corresponding to the extracted old prefecture name. For example, "Shinano" is equal to the current "Nagano Prefecture". Therefore, in the case where a character string "Shinano" is extracted as a value, the processor 20 performs cleansing processing using a cleansing learning device 22 that is linked with "Nagano Prefecture" corresponding to "Shinano".

Example 5 of First Exemplary Embodiment

In Example 5 of the first exemplary embodiment, the processor 20 performs cleansing processing using a cleansing learning device 22 corresponding to a direction in which a value is written relative to the position of a key. For example, a key is a character string "registered domicile", a character string "domicile registered", or a character string "domicile registered of address", and a value is a character string representing the name of a local government.

For example, in the certificate of Year 1994 version family register 28, as illustrated in FIG. 4, a character string "XX Prefecture . . . " as a value is written on the right of the character string "registered domicile" as a key. In the certificate of Year 1948 version family register 30, as illustrated in FIG. 5, a character string "XX Prefecture . . . " as a value is written below the character string "domicile registered" as a key. In the certificate of Year 1915 version family register 32, as illustrated in FIG. 6, a character string "XX Prefecture . . . " as a value is written below the character string "domicile registered" as a key. In the certificate of Year 1898 version family register 34, as illustrated in FIG. 7, a character string "XX Prefecture . . . " as a value is written below the character string "domicile registered of address" as a key.

In Example 5, in the case where a value is extracted from a position on the right side of a key, the processor 20 performs cleansing processing using the cleansing learning device 22A dedicated to certificates of Year 1994 version family register. In the case where a value is extracted from a position below a key, the processor 20 performs cleansing processing using the cleansing learning device 22B dedicated to certificates of Year 1948 version family register, the cleansing learning device 22C dedicated to certificates of Year 1915 version family registers, or the cleansing learning device 22D dedicated to certificates of Year 1898 version family register.

Example 6 of First Exemplary Embodiment

Example 6 of the first exemplary embodiment will be described below. In the case where a document as a reading target is a certificate of family register and a cleansing learning device 22 dedicated to the period for the certificate of family register is selected, the cleansing learning device 22 may be selected based on information indicating removal from the family register.

For example, in the certificate of Year 1994 version family register 28 illustrated in FIG. 4, as indicated by the sign 28h, a person who has been removed from the family register is represented by a character string "removed" enclosed by a frame. In contrast, in the certificate of Year 1948 version family register 30 illustrated in FIG. 5, as indicated by the sign 30h, a cross mark is provided for a person who has been removed from the family register. Also in the certificate of Year 1915 version family register 32 and the certificate of Year 1898 version family register 34, cross marks are provided for persons who have been removed from the family registers.

In Example 6, in the case where the character string "removed" enclosed in a frame is extracted, the processor 20 performs cleansing processing using the cleansing learning device 22A dedicated to certificates of Year 1994 version family register. In the case where a cross mark is extracted, the processor 20 performs cleansing processing using the cleansing learning device 22B dedicated to certificates of Year 1948 version family register, the cleansing learning device 22C dedicated to certificates of Year 1915 version family register, or the cleansing learning device 22D dedicated to certificates of Year 1898 version family register.

Second Exemplary Embodiment

A second exemplary embodiment will be described below. As in the first exemplary embodiment, the information processing apparatus 10 according to the second exemplary embodiment includes a communication device 12, a UI 14, a memory device 16, an image reading device 18, and a processor 20.

In the second exemplary embodiment, the processor 20 generates, by cleansing processing corresponding to appearance characteristics of a document represented in first image data, second image data not representing information of a deletion target out of information represented in the first image data but representing information other than the information of the deletion target. That is, the processor 20 changes cleansing processing according to the appearance characteristics of a document and performs the cleansing processing for the first image data. The processor 20 may change a method for cleansing processing according to the appearance characteristics of a document or may change an engine for the cleansing processing.

As another example, the processor 20 may perform character recognition processing according to appearance characteristics of a document represented in image data to recognize characters from the image data. That is, the processor 20 changes character recognition processing according to the appearance characteristics of the document and performs the character recognition processing for the image data. The processor 20 may change a method for character recognition processing (for example, an algorithm for character recognition processing) or change an engine for the character recognition processing according to appearance characteristics of the document. The scope of the concept of an engine for character recognition processing may encompass a character recognition learning device that implements character recognition processing by artificial intelligence. As still another example, the processor 20 may change a dictionary used for character recognition according to appearance characteristics of a document.

The processor 20 may perform cleansing processing corresponding to the appearance characteristics of a document represented in first image data to generate second image data and perform character recognition processing corresponding to the appearance characteristics to recognize characters from the second image data.

The appearance characteristics of a document are information not regarded as a target for character recognition, and for example, information reflecting characteristics of a document as a reading target. The appearance characteristics of a document may change according to the type of the document, the period in which the document is created, the person who creates the document, the purpose of the document, and the like. The appearance characteristics of the document are, for example, the shape of a frame in the document.

Furthermore, as in the first exemplary embodiment, the information processing apparatus 10 according to the second exemplary embodiment includes a cleansing learning device 22, a character recognition learning device 24, and a character recognition dictionary 26.

Examples of the second exemplary embodiment will be described below.

Example 1 of Second Exemplary Embodiment

In Example 1 of the second exemplary embodiment, the processor 20 changes cleansing processing according to appearance characteristics of a document and performs the cleansing processing.

For example, the information processing apparatus 10 according to the second exemplary embodiment includes a plurality of different cleansing learning devices 22. Different cleansing learning devices 22 are created for individual appearance characteristics of documents represented in first image data, and information indicating the appearance characteristics is linked with the cleansing learning devices 22. Information of a deletion target and appearance characteristics of a document may change according to the type of the document, the period in which the document is created, the person who creates the document, the purpose of the document, and the like. That is, information of a deletion target has a correspondence relationship with respect to appearance characteristics of a document. A cleansing learning device 22 that is linked with information indicating appearance characteristics of a certain document is a cleansing learning device that is dedicated to information of a deletion target corresponding to the appearance characteristics and is configured to learn to generate, from first image data, second image data not representing the deletion target corresponding to the appearance characteristics but representing information other than the information of the deletion target.

Example 1 of the second exemplary embodiment will be described with reference to FIG. 16. FIG. 16 is a flowchart illustrating the flow of a process according to Example 1 of the second exemplary embodiment.

First, the image reading device 18 reads a document, and generates first image data representing the document (S20).

Next, the processor 20 extracts appearance characteristics of the document represented in the first image data from the first image data (S21). For example, the appearance characteristics may be extracted using a known technique.

Next, the processor 20 selects, from among the plurality of cleansing learning devices 22, a cleansing learning device 22 that is dedicated to the type of the read document and linked with information indicating the appearance characteristics of the document extracted from the first image data (S22). A user may operate the UI 14 to specify the type of the document or the processor 20 may analyze the first image data to identify the type of the document.

Next, the processor 20 performs cleansing processing for the first image data using the cleansing learning device 22 selected in S22 (S23). Accordingly, second image data not representing information of a deletion target but representing information other than the information of the deletion target is generated.

Next, the processor 20 performs character recognition processing for the second image data using the character recognition learning device 24 (S24). Accordingly, characters are recognized from the second image data. The character recognition processing may be performed by an apparatus different from the information processing apparatus 10.

Example 2 of Second Exemplary Embodiment

In Example 2 of the second exemplary embodiment, the processor 20 changes character recognition processing according to appearance characteristics of a document and performs the character recognition processing.

For example, the information processing apparatus 10 according to the second exemplary embodiment includes a plurality of different character recognition learning devices 24. The character recognition learning devices 24 perform different types of character recognition processing. For example, the character recognition learning devices 24 may differ according to the types of documents, differ according to the periods in which the documents are created, differ according to the people who create the documents, or differ according to the purposes of the documents. For example, an algorithm for layout analysis of a document represented in image data, an algorithm for extracting a row and a column, an algorithm for extracting a character from a row and a column, an algorithm for normalizing a character, an algorithm for extracting characteristics of a character, an algorithm for matching a character registered in a character recognition dictionary with extracted characters, an algorithm for knowledge processing, and the like differ among the character recognition learning devices 24.

Characteristics of a character (for example, the style of handwriting of the character (that is, the shape of the character), the size of the character, blur of the character, the way of writing the character, and the like) written in a document may differ according to the type of the document, the period in which the document is created, the person who creates the document, the purpose of the document, and the like. Furthermore, appearance characteristics of the document may change according to the type of the document, the period in which the document is created, the person who creates the document, the purpose of the document, and the like. Therefore, characteristics of a character written in a document have a correspondence relationship with respect to appearance characteristics of the document.

Different character recognition learning devices 24 are created for individual appearance characteristics of documents as reading targets, and information indicating the appearance characteristics is linked with the character recognition learning devices 24. A character recognition learning device 24 that is linked with information indicating appearance characteristics of a document is a character recognition learning device that is dedicated to characteristics of the document corresponding to the appearance characteristics, and the character recognition learning device 24 is configured to learn to recognize a character from the document having the appearance characteristics.

Example 2 of the second exemplary embodiment will be described with reference to FIG. 17. FIG. 17 is a flowchart illustrating the flow of a process according to Example 2 of the second exemplary embodiment.

First, the image reading device 18 reads a document, and generates image data representing the document (S30).

Next, the processor 20 extracts appearance characteristics of the document represented in the image data generated in S30 from the image data (S31).

Next, the processor 20 selects, from among the plurality of character recognition learning devices 24, a character recognition learning device 24 that is dedicated to the type of the read document and linked with information indicating the appearance characteristics of the document extracted from the image data generated in S30 (S32). A user may operate the UI 14 to specify the type of the document or the processor 20 may analyze the image data to identify the type of the document.

Next, the processor 20 performs character recognition processing for the image data using the character recognition learning device 24 selected in S32 (S33). Accordingly, characters are recognized from the image data.

Example 3 of Second Exemplary Embodiment

In Example 3 of the second exemplary embodiment, the processor 20 performs character recognition processing using a character recognition dictionary corresponding to appearance characteristics of a document.

For example, the information processing apparatus 10 according to the second exemplary embodiment includes a plurality of different character recognition dictionaries 26. For example, the character recognition dictionaries 26 may differ according to the types of documents, differ according to the periods in which the documents are created, or differ according to the people who create the documents.

Different character recognition dictionaries 26 are created for individual appearance characteristics of documents as reading targets, and information indicating the appearance characteristics is linked with the character recognition dictionaries 26. A character recognition dictionary 26 that is linked with information indicating appearance characteristics of a document is a character recognition dictionary that is dedicated to characteristics of a character corresponding to the appearance characteristics, and the characteristics of the character corresponding to the appearance characteristics are registered in the character recognition dictionary 26 such that characters may be recognized from a document having the appearance characteristics.

Example 3 of the second exemplary embodiment will be described below with reference to FIG. 18. FIG. 18 is a flowchart illustrating the flow of a process according to Example 3 of the second exemplary embodiment.

First, the image reading device 18 reads a document, and generates image data representing the document (S40).

Next, the processor 20 extracts appearance characteristics of the document represented in the image data generated in S40 from the image data (S41).

Next, the processor 20 selects, from among the plurality of character recognition dictionaries 26, a character recognition dictionary 26 that is dedicated to the type of the read document and linked with information indicating the appearance characteristics of the document extracted from the image data generated in S40 (S42).

Next, the processor 20 performs character recognition processing for the image data using the character recognition dictionary 26 selected in S42 (S43). Accordingly, characters are recognized from the image data.

The second exemplary embodiment will be described below by way of specific example. For example, a document as a reading target is a certificate of family register, and appearance characteristics are the shape of a frame in the document.

In general, the shape of a frame in a certificate of family register differs according to the period for the certificate of family register. For example, the certificate of Year 1994 version family register 28 illustrated in FIG. 4 has a frame including two columns, and characters are written from the left to the right. In contrast, each of the certificate of Year 1948 version family register 30 illustrated in FIG. 5, the certificate of Year 1915 version family register 32 illustrated in FIG. 6, and the certificate of Year 1898 version family register 34 illustrated in FIG. 7 has a frame including a large number of columns compared to the certificate of Year 1994 version family register 28, and characters are written from the top to the bottom. As described above, the shape of the frame of the certificate of Year 1994 version family register 28 is different from the shapes of frames in other certificates of family register. Therefore, the certificate of Year 1994 version family register 28 is able to be distinguished from other certificates of family register according to the shape of the frame.

Furthermore, as illustrated in FIG. 19, in the certificate of Year 1948 version family register 30, a thick frame (for example, a frame indicated by a sign 30r), which provided in neither the certificate of Year 1915 version family register 32 nor the certificate of Year 1898 version family register 34, is formed on the left side of the entry field for the character string "domicile registered". The certificate of Year 1948 version family register 30 is able to be distinguished from other certificates of family register according to whether or not the thick frame is provided.

As described above, shapes of frames differ according to the periods for the certificates of family register. Therefore, a period for a certificate of family register is able to be estimated based on the shape of a frame extracted from image data representing the certificate of family register as a reading target.

In Example 1 of the second exemplary embodiment, for example, the processor 20 extracts, using a known technique, the shape of a frame from first image data representing a certificate of family register as a reading target, selects a cleansing learning device 22 corresponding to the shape of the frame, and performs cleansing processing using the selected cleansing learning device 22. The cleansing learning device 22 corresponding to the shape of the frame extracted from the first image data is the cleansing learning device 22 that is dedicated to the certificate of family register from which the shape of the frame is extracted. The shape of a frame reflects the period for a certificate of family register. Therefore, the cleansing learning device 22 dedicated to the certificate of family register may be regarded as a cleansing learning device that is dedicated to the period for the certificate of family register. The cleansing learning device 22 dedicated to the certificate of family register is a cleansing learning device that is configured to learn to generate, from first image data representing the certificate of family register, second image data not representing a background pattern but representing information other than information of the background pattern.

For example, the cleansing learning device 22A is linked in advance with the shape of a frame in certificates of Year 1994 version family register, the cleansing learning device 22B is linked in advance with the shape of a frame in certificates of Year 1948 version family register, the cleansing learning device 22C is linked in advance with the shape of a frame in certificates of Year 1915 version family register, and the cleansing learning device 22D is linked in advance with the shape of a frame in certificates of Year 1898 version family register.

For example, in the case where the shape of a frame included in the certificate of Year 1994 version family register 28 (for example, the shape of the frame indicated by the sign 30r) is extracted from first image data representing a certificate of family register as a reading target, the processor 20 selects, from among the cleansing learning devices 22A, 22B, 22C, and 22D, the cleansing learning device 22B that is linked with the extracted shape of the frame. Accordingly, the cleansing learning device 22B dedicated to certificates of Year 1948 version family register is selected.

The processor 20 performs cleansing processing using the cleansing learning device 22B for the first image data to generate second image data.

For certificates of family register other than the certificate of Year 1994 version family register 28, in a similar manner, cleansing learning devices 22 linked with extracted shapes of frames are selected, and cleansing processing is performed using the selected cleansing learning devices 22.

In Example 2 of the second exemplary embodiment, for example, the processor 20 extracts, using a known technique, the shape of a frame from image data representing a certificate of family register as a reading target, selects a character recognition learning device 24 corresponding to the shape of the frame, and performs character recognition processing using the selected character recognition learning device 24. The character recognition learning device 24 corresponding to the shape of the frame extracted from the image data is the character recognition learning device 24 that is dedicated to the certificate of family register from which the shape of the frame is extracted. The shape of the frame reflects the period for the certificate of family register. Therefore, the character recognition learning device 24 dedicated to the certificate of family register may be regarded as a character recognition learning device dedicated to the period for the certificate of family register.

Figure 20:
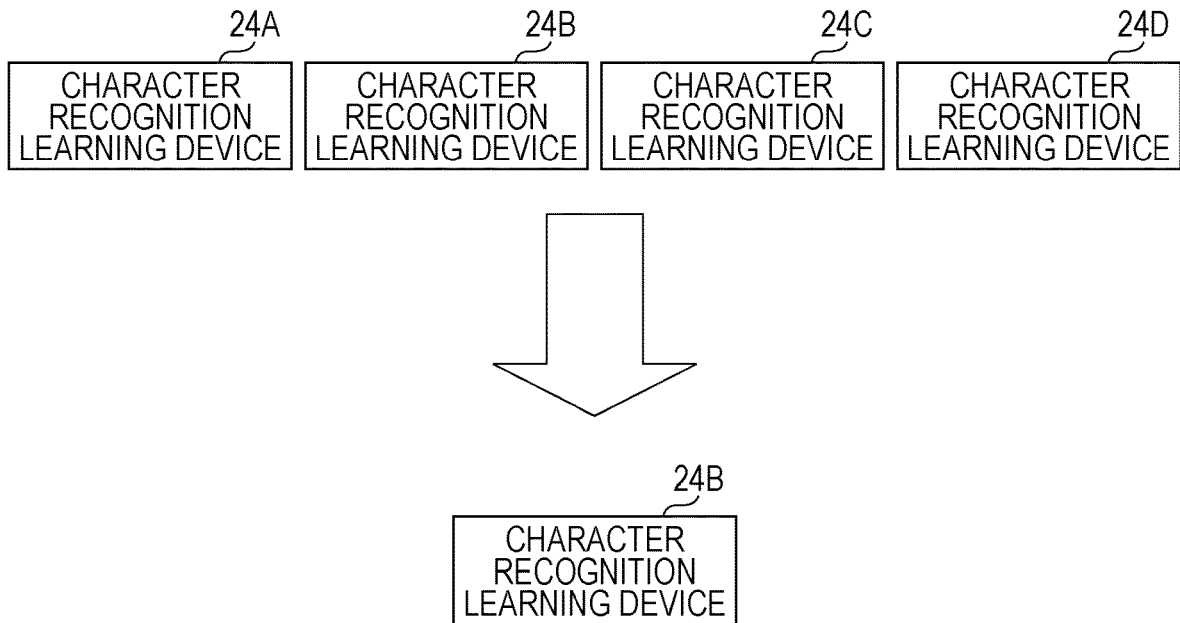
FIG. 20 is a diagram illustrating character recognition learning devices.

FIG. 20 illustrates character recognition learning devices 24 dedicated to periods for various certificates of family register. The character recognition learning device 24A is a character recognition learning device dedicated to certificates of Year 1994 version family register. The character recognition learning device 24A is linked in advance with the shape of a frame in a certificate of Year 1994 version family register. The character recognition learning device 24B is a character recognition learning device dedicated to certificates of Year 1948 version family register. The character recognition learning device 24B is linked in advance with the shape of a frame in a certificate of Year 1948 version family register. The character recognition learning device 24C is a character recognition learning device dedicated to certificates of Year 1915 version family register. The character recognition learning device 24C is linked in advance with the shape of a frame in a certificate of Year 1915 version family register. The character recognition learning device 24D is a character recognition learning device dedicated to certificates of Year 1898 version family register. The character recognition learning device 24D is linked in advance with the shape of a certificate of Year 1898 version family register.

For example, in the case where the shape of a frame included in the certificate of Year 1994 version family register 28 (for example, the shape of a frame indicated by the sign 30r) is extracted from image data representing a certificate of family register as a reading target, the processor 20 selects, from among the character recognition learning devices 24A, 24B, 24C, and 24D, the character recognition learning device 24B that is linked with the extracted shape of the frame. Accordingly, the character recognition learning device 24B dedicated to certificates of Year 1994 version family register is selected.

The processor 20 performs character recognition processing using the character recognition learning device 24B for the image data to recognize characters from the image data.

For certificates of family register other than the certificate of Year 1994 version family register 28, in a similar manner, the character recognition learning devices 24 linked with extracted shapes of frames are selected, and character recognition processing is performed using the selected character recognition learning devices 24.

In Example 3 of the second exemplary embodiment, for example, the processor 20 extracts, using a known technique, the shape of a frame from image data representing a certificate of family register as a reading target, selects a character recognition dictionary 26 corresponding to the extracted shape of the frame, and performs character recognition processing using the selected character recognition dictionary 26. The character recognition dictionary 26 corresponding to the shape of the frame extracted from the image data is a character recognition dictionary that is dedicated to a certificate of family register from which the shape of the frame is extracted. The shape of the frame reflects the period for the certificate of family register. Therefore, the character recognition dictionary 26 dedicated to the certificate of family register may be regarded as a character recognition dictionary dedicated to the period for the certificate of family register.

Figure 21:
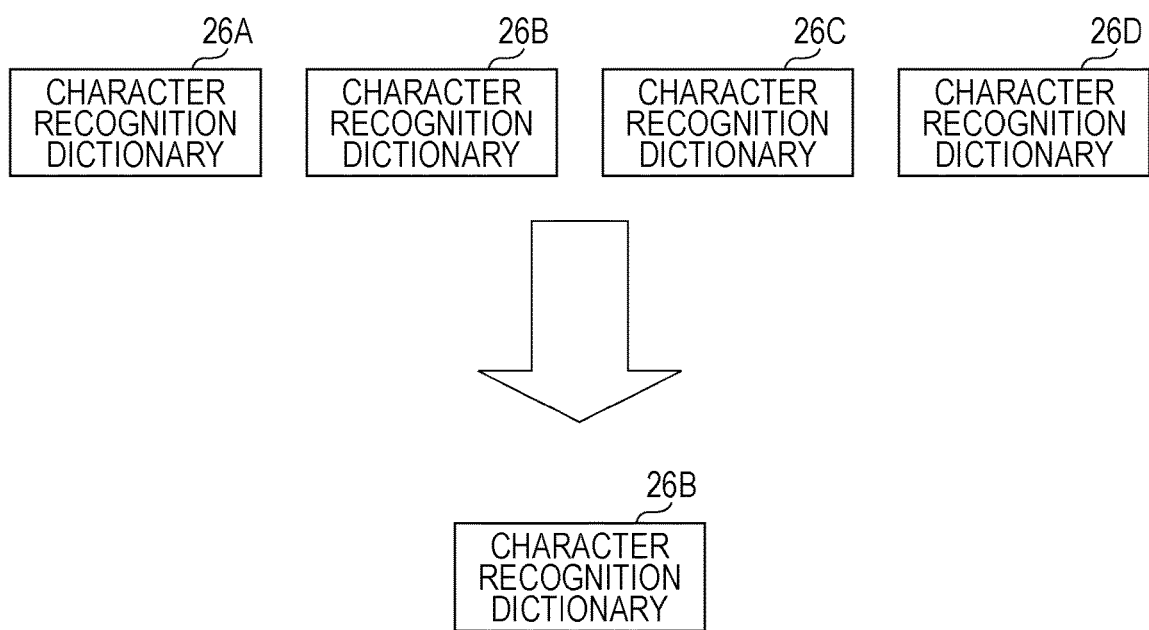
FIG. 21 is a diagram illustrating character recognition dictionaries.

FIG. 21 illustrates the character recognition dictionaries 26 dedicated to periods for various certificates of family register. The character recognition dictionary 26A is a character recognition dictionary dedicated to certificates of Year 1994 version family register. The character recognition dictionary 26A is linked in advance with the shape of a frame in a certificate of Year 1994 version family register. The character recognition dictionary 26B is a character recognition dictionary dedicated to certificates of Year 1948 version family register. The character recognition dictionary 26B is linked in advance with the shape of a frame in a certificate of Year 1948 version family register. The character recognition dictionary 26C is a character recognition dictionary dedicated to certificates of Year 1915 version family register. The character recognition dictionary 26C is linked in advance with the shape of a frame in a certificate of Year 1915 version family register. The character recognition dictionary 26D is a character recognition dictionary dedicated to certificates of Year 1898 version family register. The character recognition dictionary 26D is linked in advance with the shape of a frame in a certificate of Year 1898 version family register.

For example, in the case where the shape of a frame included in the certificate of Year 1994 version family register 28 (for example, the shape of a frame indicated by the sign 30r) is extracted from image data representing a certificate of family register as a reading target, the processor 20 selects, from among the character recognition dictionaries 26A, 26B, 26C, and 26D, the character recognition dictionary 26B that is linked with the extracted shape of the frame. Accordingly, the character recognition dictionary 26B dedicated to certificates of Year 1994 version family register is selected.

The processor 20 performs character recognition processing using the character recognition dictionary 26 for the image data to recognize characters from the image data.

For certificates of family register other than the certificate of Year 1994 version family register 28, in a similar manner, the character recognition dictionaries 26 linked with extracted shapes of frames are selected, and character recognition processing is performed using the selected character recognition dictionaries 26.

Example 4 of Second Exemplary Embodiment

In Example 4 of the second exemplary embodiment, appearance characteristics of a document represent the shape of a character in a document. For example, according to the period in which a certificate of family register is created, the certificate of family register is typed or handwritten. Furthermore, even in the case where the periods in which certificates of family register are created are the same, the certificates of family register may be typed or may be handwritten. For example, in the case where a certificate of family register is computerized, the certificate of family register may be typed. In the case where a certificate of family register is not computerized, the certificate of family register may be handwritten.

In Example 4 of the second exemplary embodiment, the processor 20 performs cleansing processing corresponding to the shape of a character in a document as a reading target. For example, a cleansing learning device 22 dedicated to typing and a cleansing learning device 22 dedicated to handwriting are created in advance. The cleansing learning device 22 dedicated to typing is a cleansing learning device that is configured to learn to generate, from first image data representing a certificate of family register created by typing, second image data not representing information of a deletion target (for example, a background pattern) but representing information other than the information of the deletion target. The cleansing learning device 22 dedicated to handwriting is a cleansing learning device that is configured to learn to generate, from first image data representing a certificate of family register created by handwriting, second image data not representing information of a deletion target but representing information other than the information of the deletion target. Information indicating typing is linked in advance with the cleansing learning device 22 dedicated to typing, and information indicating handwriting is linked in advance with the cleansing learning device 22 dedicated to handwriting.

The processor 20 identifies, using a known technique, whether a certificate of family register as a reading target represented in the second image data has been created by typing or created by handwriting. For example, the processor 20 performs character recognition processing for the second image data representing the certificate of family register as the reading target, counts the number of typed characters and the number of handwritten characters in the certificate of family register, and identifies, based on the number of typed characters and the number of handwritten characters, whether the certificate of family register has been created by typing or created by handwriting. For example, in the case where the number of typed characters is larger than the number of handwritten characters, the processor 20 identifies that the certificate of family register is a document created by typing. In the case where the number of handwritten characters is larger than the number of typed characters, the processor 20 identifies that the certificate of family register is a document created by handwriting. Obviously, by using other techniques, the processor 20 may identify whether a document as a reading target is a document created by typing or created by handwriting.

In the case where a certificate of family register as a reading target is created by typing, the processor 20 performs cleansing processing using the cleansing learning device 22 linked with information indicating typing. In the case where a certificate of family register as a reading target is created by handwriting, the processor 20 performs cleansing processing using the cleansing learning device 22 linked with information indicating handwriting.

As another example, the processor 20 may perform character recognition processing corresponding to the shape of a character in a document as a reading target. For example, a character recognition learning device 24 dedicated to typing and a character recognition learning device 24 dedicated to handwriting are created in advance. The character recognition learning device 24 dedicated to typing is a character recognition learning device that is configured to learn to recognize typed characters from image data representing a certificate of family register created by typing. The character recognition learning device 24 dedicated to handwriting is a character recognition learning device that is configured to learn to recognize handwritten characters from image data representing a certificate of family register created by handwriting. Information indicating typing is linked in advance with the character recognition learning device 24 dedicated to typing, and information indicating handwriting is linked in advance with the character recognition learning device 24 dedicated to handwriting.

In the case where a certificate of family register as a reading target is created by typing, the processor 20 performs character recognition processing using the character recognition learning device 24 linked with information indicating typing. In the case where a certificate of family register as a reading target is created by handwriting, the processor 20 performs character recognition processing using the character recognition learning device 24 linked with information indicating handwriting.

As a still another example, the processor 20 may perform character recognition processing using a character recognition dictionary corresponding to the shape of a character in a document as a reading target. For example, a character recognition dictionary 26 dedicated to typing and a character recognition dictionary 26 dedicated to handwriting are created in advance. The character recognition dictionary 26 dedicated to typing is a dictionary in which characters for recognizing typed characters from image data are registered. The character recognition dictionary 26 dedicated to handwriting is a dictionary in which characters for recognizing handwritten characters from image data are registered. Information indicating typing is linked in advance with the character recognition dictionary 26 dedicated to typing, and information indicating handwriting is linked in advance with the character recognition dictionary 26 dedicated to handwriting.

In the case where a certificate of family register as a reading target is created by typing, the processor 20 performs character recognition processing using the character recognition dictionary 26 linked with information indicating typing. In the case where a certificate of family register as a reading target is created by handwriting, the processor 20 performs character recognition processing using the character recognition dictionary 26 linked with information indicating handwriting.

Furthermore, in the case where a certificate of family register is created by handwriting, the processor 20 may identify the style of handwriting (for example, a large character, an obsolete hiragana letter, a broken character, a variant character, a cursive character, or the like) and change the cleansing learning device 22, the character recognition learning device 24, or the character recognition dictionary 26 in accordance with the identified style of handwriting.

The character recognition dictionary 26 may be included in the character recognition learning device 24. In this case, one of an algorithm for character recognition processing and a character recognition dictionary or both of an algorithm for character recognition processing and a character recognition dictionary may be changed according to appearance characteristics.

In the first exemplary embodiment and the second exemplary embodiment described above, a certificate of family register is used as an example of a document. However, a certificate of family register is merely an example of a document. Documents other than certificates of family register may be used as documents as reading targets. Processing according to each of Examples performed for certificates of family register may also be performed for documents other than certificates of family register as reading targets.

In the embodiments above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to
  receive first image data representing a document,
  specify at least one of a type of the document, a period in which the document is created, a region in which the document is issued, based on appearance characteristics of the document, wherein different appearance characteristics of the document are pre-associated with different types of documents, different periods in which the documents are created, or different regions in which the documents are issued, and
  generate, by processing corresponding to the type, the period or the region, second image data including data of the first image data except not a background pattern,
wherein the processing includes specifying an optimal cleansing learning device for deleting the background pattern based on the type, the period or the region.

2. The information processing apparatus according to claim 1, wherein the appearance characteristics represent a shape of a frame in the document.

3. The information processing apparatus according to claim 1, wherein the appearance characteristics represent a shape of a character in the document.

4. An information processing apparatus comprising:
a processor configured to
  receive image data representing a document,
  specify at least one of a type of the document, a period in which the document is created, a region in which the document is issued, based on appearance characteristics of the document, wherein different appearance characteristics of the document are pre-associated with different types of documents, different periods in which the documents are created, or different regions in which the documents are issued, and
  recognize, by processing that is performed for recognizing a character represented in the image data and corresponds to the type, the period or the region, the character that is not part of a deletion target,
wherein the processing includes specifying an optimal cleansing learning device for deleting the character that is not part of a deletion target based on the type, the period or the region.

5. The information processing apparatus according to claim 4, wherein the appearance characteristics represent a shape of a frame in the document.

6. The information processing apparatus according to claim 4, wherein the appearance characteristics represent a shape of a character in the document.

7. A non-transitory computer readable medium storing a program causing a computer to execute a process for information processing, the process comprising:
receiving first image data representing a document; and
specify at least one of a type of the document, a period in which the document is created, a region in which the document is issued, based on appearance characteristics of the document, wherein different appearance characteristics of the document are pre-associated with different types of documents, different periods in which the documents are created, or different regions in which the documents are issued, and
generating, by processing corresponding to the type, the period or the region, second image data including data of the first image data except not a background pattern,
wherein the processing includes specifying an optimal cleansing learning device for deleting the background pattern based on the type, the period or the region.

8. A non-transitory computer readable medium storing a program causing a computer to execute a process for information processing, the process comprising:
receiving first image data representing a document, and
specifying at least one of a type of the document, a period in which the document is created, a region in which the document is issued, based on appearance characteristics of the document, wherein different appearance characteristics of the document are pre-associated with different types of documents, different periods in which the documents are created, or different regions in which the documents are issued, and
recognizing, by processing that is performed for recognizing a character represented in the first image data and corresponds to the type, the period or the region, the character that is not part of a deletion target,
wherein the processing includes specifying an optimal cleansing learning device for deleting the character that is not part of a deletion target based on the type, the period or the region.

* * * * *